US012675637B2

(12) United States Patent
Shima

(10) Patent No.: US 12,675,637 B2
(45) Date of Patent: Jul. 7, 2026

(54) APPARATUS, SYSTEM, AND METHOD OF ASSISTING INFORMATION SHARING, AND RECORDING MEDIUM

(71) Applicant: Ricoh Company, Ltd., Tokyo (JP)

(72) Inventor: Tomohiro Shima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/408,623

(22) Filed: Jan. 10, 2024

(65) Prior Publication Data

US 2024/0143933 A1 May 2, 2024

Related U.S. Application Data

(63) Continuation of application No. 17/885,541, filed on Aug. 11, 2022, now Pat. No. 11,907,667, which is a
(Continued)

(51) Int. Cl.
*G06F 40/30* (2020.01)
*G06F 9/44* (2018.01)
(Continued)

(52) U.S. Cl.
CPC ............... *G06F 40/30* (2020.01); *G06F 9/44* (2013.01); *G06F 9/451* (2018.02); *G06F 16/345* (2019.01);
(Continued)

(58) Field of Classification Search
USPC ....................................................... 704/1–504
See application file for complete search history.

(56) References Cited

U.S. PATENT DOCUMENTS

| | | | |
|---|---|---|---|
| 6,446,081 B1 | 9/2002 | Preston | |
| 7,139,706 B2 * | 11/2006 | Yuschik | ................ G10L 15/065 |
| | | | 704/E15.04 |

(Continued)

FOREIGN PATENT DOCUMENTS

| | | |
|---|---|---|
| JP | 2007-43493 A | 2/2007 |
| JP | 2013-3942 A | 1/2013 |

(Continued)

OTHER PUBLICATIONS

Honda and Okumura, "Text Segmentation based on Lexical Cohesion", School of Information Science, Japan Advanced Institute of Science and Technology p. 25-32, Jul. 21, 1994.
(Continued)

*Primary Examiner* — Marcus T Riley
(74) *Attorney, Agent, or Firm* — XSENSUS LLP

(57) ABSTRACT

A system for assisting sharing of information includes circuitry to: input a plurality of sentences each representing a statement made by one of a plurality of users, the sentence being generated by speaking or writing during a meeting or by extracting from at least one of meeting data, email data, electronic file data, and chat data at any time; determine a statement type of the statement represented by each one of the plurality of sentences, the statement type being one of a plurality of statement types previously determined; select, from among the plurality of sentences being input, one or more sentences each representing a statement of a specific statement type of the plurality of types; and output a list of the selected one or more sentences as key statements of the plurality of sentences.

18 Claims, 27 Drawing Sheets

Related U.S. Application Data continuation of application No. 17/111,565, filed on Dec. 4, 2020, now Pat. No. 11,461,557, which is a continuation of application No. 16/796,313, filed on Feb. 20, 2020, now Pat. No. 10,891,441, which is a continuation of application No. 15/606,691, filed on May 26, 2017, now Pat. No. 10,614,162.

(51) Int. Cl.

| | |
|---|---|
| *G06F 9/451* | (2018.01) |
| *G06F 16/34* | (2025.01) |
| *G06F 16/432* | (2019.01) |
| *G06F 40/284* | (2020.01) |
| *G06F 40/35* | (2020.01) |
| *G06N 20/00* | (2019.01) |
| *G06Q 10/10* | (2023.01) |
| *G09G 3/02* | (2006.01) |

(52) U.S. Cl.
CPC .......... *G06F 16/433* (2019.01); *G06F 40/284* (2020.01); *G06F 40/35* (2020.01); *G06N 20/00* (2019.01); *G06Q 10/10* (2013.01); *G09G 3/025* (2013.01); *G09G 2380/14* (2013.01)

(56) References Cited

U.S. PATENT DOCUMENTS

| | | | | |
|---|---|---|---|---|
| 8,165,883 | B2 * | 4/2012 | Galanes | G06F 9/451 |
| | | | | 704/270.1 |
| 8,224,650 | B2 * | 7/2012 | Galanes | G10L 15/26 |
| | | | | 715/239 |
| 8,311,835 | B2 * | 11/2012 | Lecoeuche | H04M 1/72445 |
| | | | | 704/270.1 |
| 8,335,754 | B2 * | 12/2012 | Dawson | G06F 16/322 |
| | | | | 706/45 |
| 8,676,937 | B2 * | 3/2014 | Rapaport | H04L 67/306 |
| | | | | 709/219 |
| 8,738,558 | B2 | 5/2014 | Antebi et al. | |
| 8,756,185 | B2 * | 6/2014 | Dawson | G06F 40/30 |
| | | | | 706/45 |
| 8,918,320 | B2 * | 12/2014 | Adler | G10L 25/63 |
| | | | | 704/251 |
| 8,930,187 | B2 * | 1/2015 | Kiss | G10L 25/63 |
| | | | | 704/251 |
| 9,245,254 | B2 * | 1/2016 | Lord | G06Q 10/10 |
| 9,648,061 | B2 * | 5/2017 | Cunico | G06N 5/022 |
| 9,805,020 | B2 * | 10/2017 | Gorman | G06F 40/30 |
| 10,176,167 | B2 * | 1/2019 | Evermann | G06F 40/35 |
| 10,510,051 | B2 * | 12/2019 | Nelson | H04L 12/1831 |
| 10,522,151 | B2 * | 12/2019 | Cartwright | H04M 3/56 |
| 10,572,858 | B2 * | 2/2020 | Nelson | G06F 40/35 |
| 10,614,162 | B2 * | 4/2020 | Shima | G06F 40/284 |
| 10,860,985 | B2 * | 12/2020 | Nelson | G06Q 10/10 |
| 10,891,441 | B2 * | 1/2021 | Shima | G06F 9/451 |
| 11,062,271 | B2 * | 7/2021 | Nelson | H04L 12/1818 |
| 11,307,735 | B2 * | 4/2022 | Nelson | G06F 3/04817 |
| 11,393,061 | B2 * | 7/2022 | Al-Sulaiman | G06Q 50/2053 |
| 11,461,557 | B2 * | 10/2022 | Shima | G06F 40/284 |
| 11,544,578 | B2 * | 1/2023 | Yang | G06N 5/02 |
| 11,907,667 | B2 * | 2/2024 | Shima | G09G 3/025 |

| | | | | |
|---|---|---|---|---|
| 2003/0004719 | A1 * | 1/2003 | Yuschik | G10L 15/1822 |
| | | | | 704/E15.04 |
| 2005/0071226 | A1 * | 3/2005 | Nguyen | G06Q 30/0231 |
| | | | | 705/14.31 |
| 2005/0091059 | A1 * | 4/2005 | Lecoeuche | H04M 1/72445 |
| | | | | 704/270.1 |
| 2007/0073575 | A1 * | 3/2007 | Yomogida | G06Q 10/06 |
| | | | | 705/7.15 |
| 2010/0228693 | A1 * | 9/2010 | Dawson | G06N 5/022 |
| | | | | 707/769 |
| 2012/0030149 | A1 * | 2/2012 | Antebi | G06N 5/04 |
| | | | | 706/11 |
| 2012/0123818 | A1 * | 5/2012 | Heiles | G06Q 10/06311 |
| | | | | 705/7.13 |
| 2012/0290950 | A1 * | 11/2012 | Rapaport | H04L 12/1818 |
| | | | | 715/753 |
| 2013/0144603 | A1 * | 6/2013 | Lord | H04L 67/306 |
| | | | | 704/235 |
| 2014/0019385 | A1 * | 1/2014 | Dawson | G06F 40/205 |
| | | | | 706/55 |
| 2014/0365209 | A1 * | 12/2014 | Evermann | G06F 40/35 |
| | | | | 704/9 |
| 2015/0186504 | A1 * | 7/2015 | Gorman | G06F 40/30 |
| | | | | 707/752 |
| 2015/0220836 | A1 * | 8/2015 | Wilson | G06Q 30/0269 |
| | | | | 706/46 |
| 2016/0042281 | A1 * | 2/2016 | Cunico | H04N 7/152 |
| | | | | 706/46 |
| 2017/0220997 | A1 * | 8/2017 | Shima | G06Q 10/10 |
| 2017/0344535 | A1 * | 11/2017 | Shima | G06F 40/284 |
| 2018/0101281 | A1 * | 4/2018 | Nelson | G06N 5/022 |
| 2018/0101760 | A1 * | 4/2018 | Nelson | G06N 5/04 |
| 2018/0101761 | A1 * | 4/2018 | Nelson | G06Q 10/10 |
| 2018/0101823 | A1 * | 4/2018 | Nelson | H04N 7/155 |
| 2018/0101824 | A1 * | 4/2018 | Nelson | H04L 12/1831 |
| 2018/0189352 | A1 * | 7/2018 | Ghafourifar | G06F 9/451 |
| 2018/0314689 | A1 * | 11/2018 | Wang | G10L 15/1822 |
| 2018/0336286 | A1 * | 11/2018 | Shah | G06F 1/163 |
| 2018/0336902 | A1 * | 11/2018 | Cartwright | G06F 16/61 |
| 2019/0332680 | A1 * | 10/2019 | Wang | G10L 15/07 |
| 2020/0193096 | A1 * | 6/2020 | Shima | G06F 9/451 |
| 2021/0089720 | A1 * | 3/2021 | Shima | G06F 9/451 |
| 2022/0382992 | A1 * | 12/2022 | Shima | G06F 9/44 |
| 2024/0143933 | A1 * | 5/2024 | Shima | G06N 20/00 |

FOREIGN PATENT DOCUMENTS

| | | |
|---|---|---|
| JP | 2013-182560 A | 9/2013 |
| JP | 2014-206887 A | 10/2014 |

OTHER PUBLICATIONS

Miyamura and Tokunaga, "Real-time Topic Segmentation of information seeking chat", Information Processing Society of Japan, Interest Group of Natural Language Processing, vol. NL-187, p. 71-76, Sep. 2008.

Okumura Manabu, "Introduction to Natural Language Processing", 2010, Corona Publishing CO., Ltd., Tokyo, Japan p. 102-105.

Japanese Office Action issued Dec. 22, 2020 in Japanese Patent Application No. 2017-07,1344, 2 pages.

Office Action issued Jul. 6, 2021 in Japanese Patent Application No. 2017-074344, 3 pages.

* cited by examiner

FIG. 8

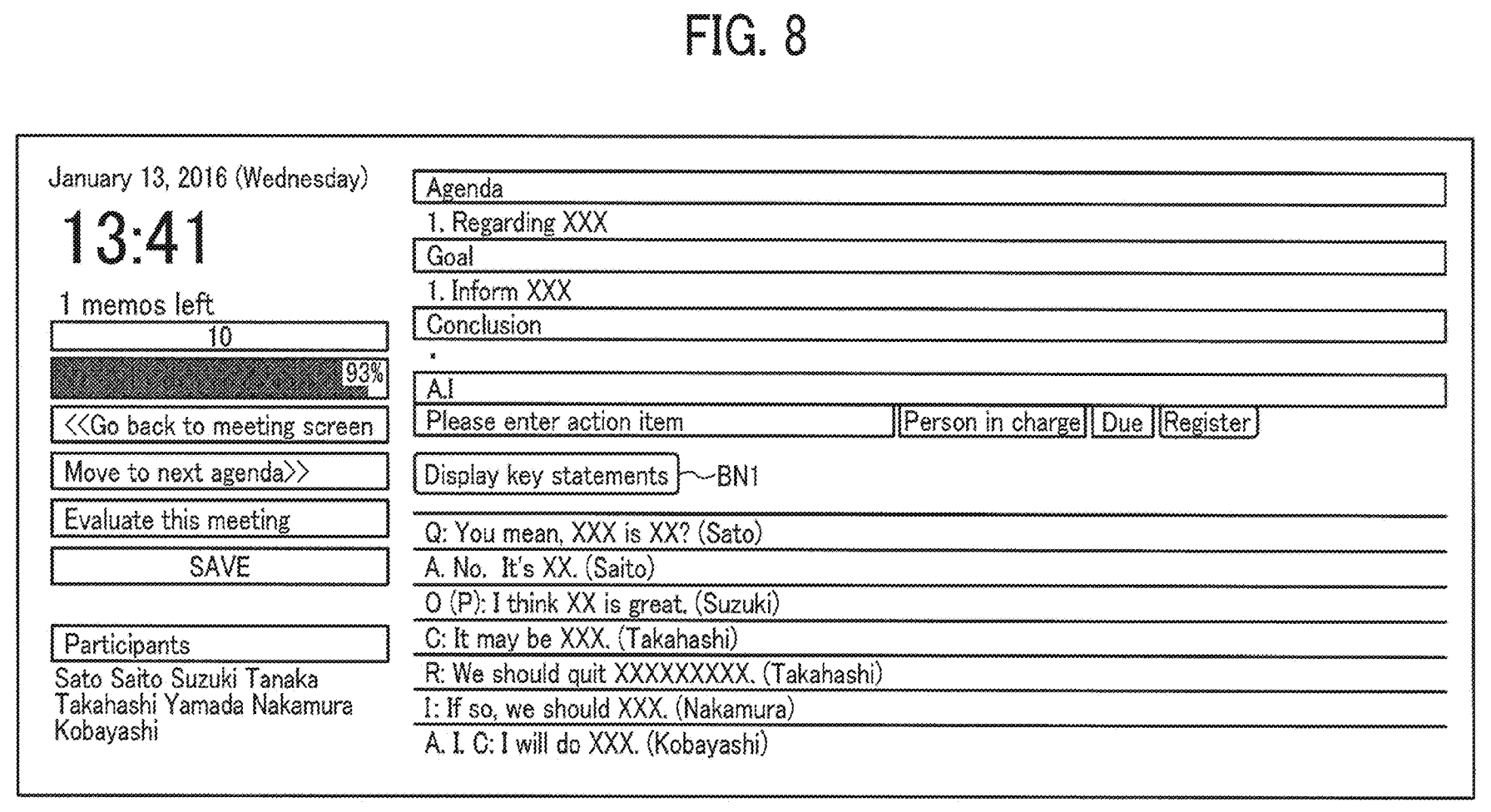

January 13, 2016 (Wednesday)

13:41

1 memos left 10     93%

<<Go back to meeting screen

Move to next agenda>>

Evaluate this meeting

SAVE

Participants
Sato Saito Suzuki Tanaka
Takahashi Yamada Nakamura
Kobayashi

Agenda

1. Regarding XXX

Goal

1. Inform XXX

Conclusion

*

AI

Please enter action item     |Person in charge| Due |Register|

Display key statements —BN1

Q: You mean, XXX is XX? (Sato)

A: No. It's XX. (Saito)

O (P): I think XX is great. (Suzuki)

C: It may be XXX (Takahashi)

R: We should quit XXXXXXXX (Takahashi)

I: If so, we should XXX (Nakamura)

A.I.C: I will do XXX. (Kobayashi)

FIG. 10

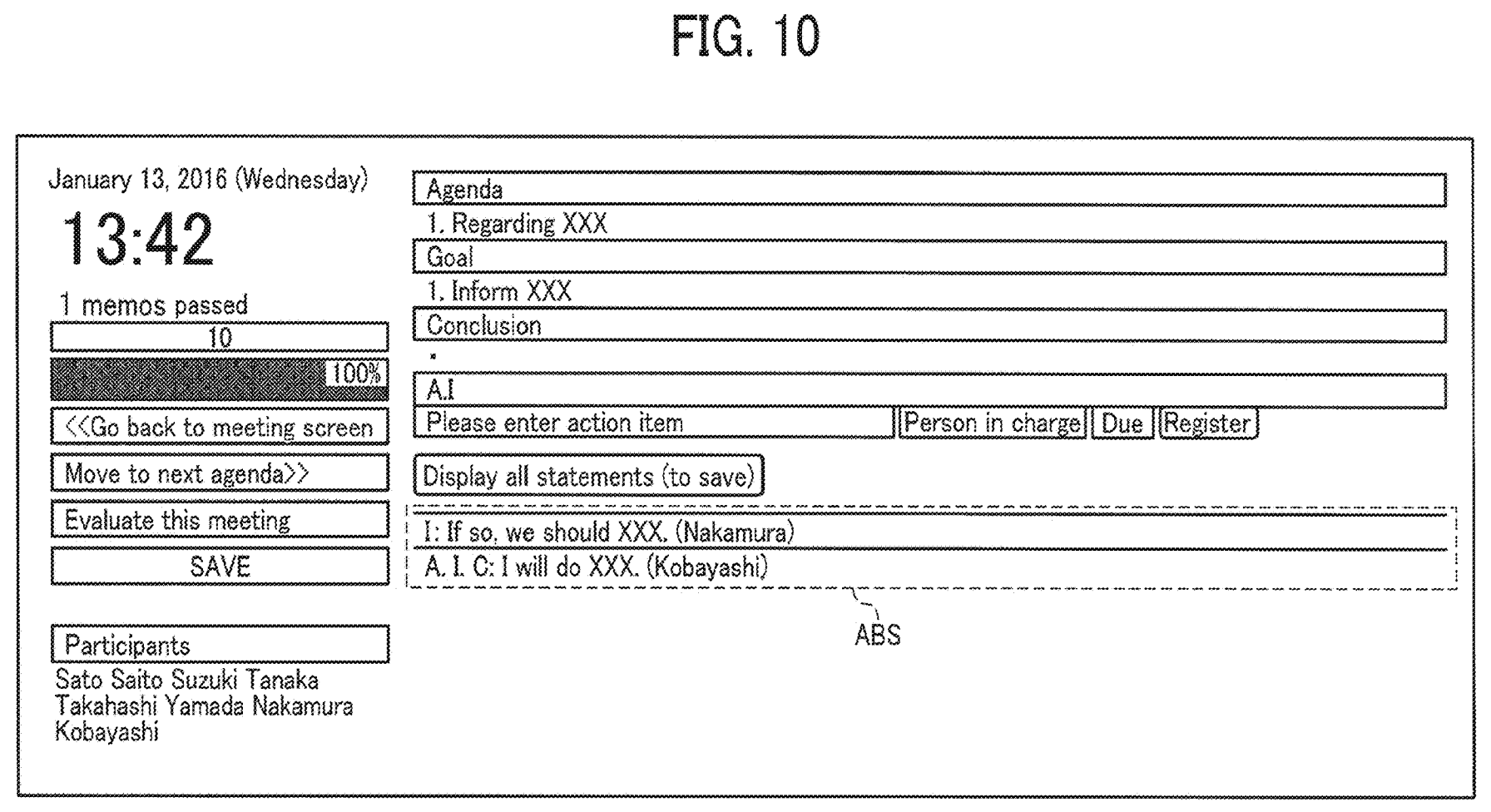

January 13, 2016 (Wednesday)

13:42

1 memos passed

| 10 | 100% |
|----|------|

<<Go back to meeting screen

Move to next agenda>>

Evaluate this meeting

SAVE

Participants
Sato Saito Suzuki Tanaka
Takahashi Yamada Nakamura
Kobayashi

Agenda
1. Regarding XXX
Goal
1. Inform XXX
Conclusion
*
A.I
Please enter action item

| | Person in charge | Due | Register |
|---|---|---|---|

Display all statements (to save)

I: If so, we should XXX. (Nakamura)
A.I.C: I will do XXX. (Kobayashi)

ABS

FIG. 14

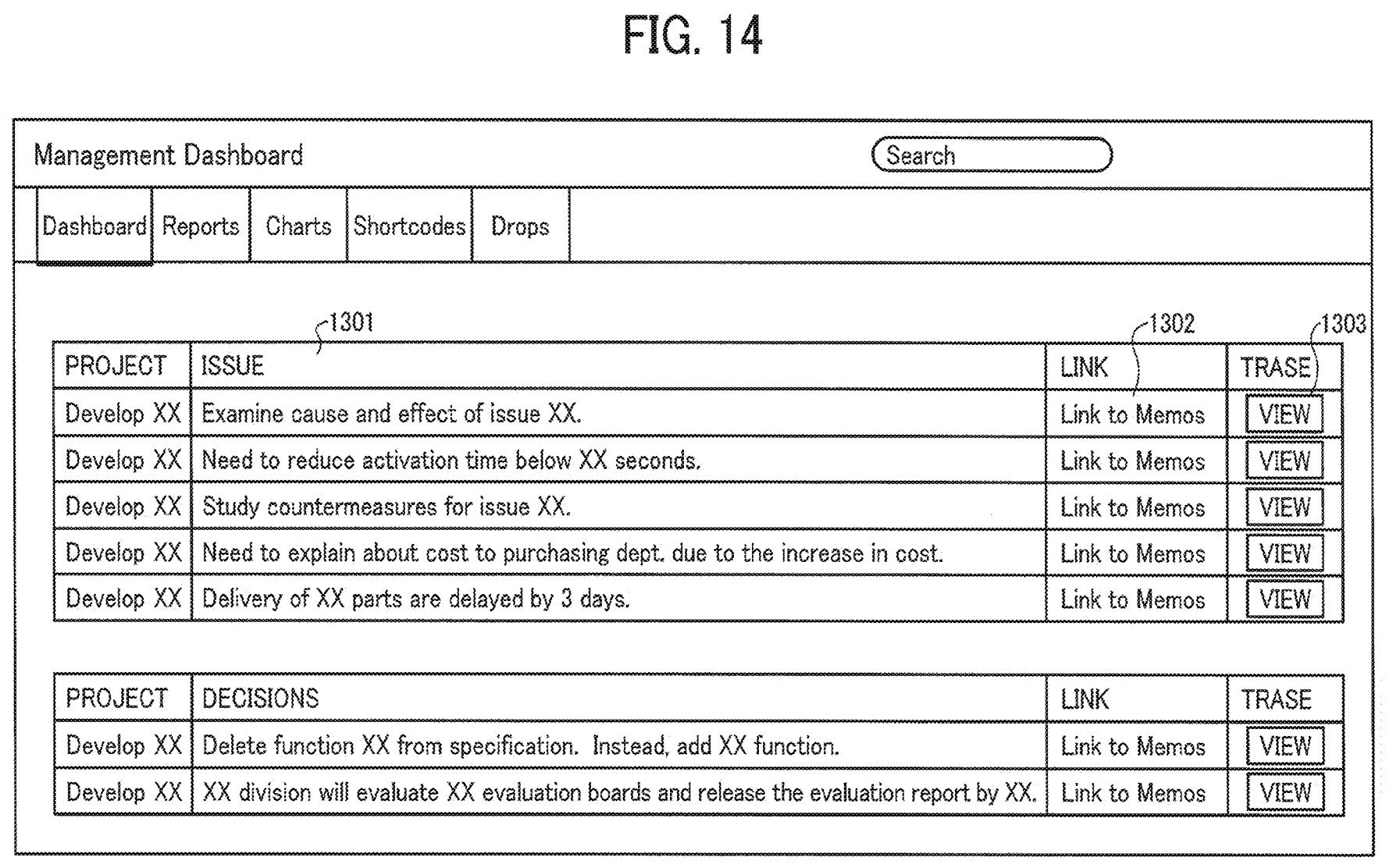

Management Dashboard

| Dashboard | Reports | Charts | Shortcodes | Drops |

Search

1301

| PROJECT | ISSUE | LINK | TRASE |
|---|---|---|---|
| Develop XX | Examine cause and effect of issue XX. | Link to Memos | VIEW |
| Develop XX | Need to reduce activation time below XX seconds. | Link to Memos | VIEW |
| Develop XX | Study countermeasures for issue XX. | Link to Memos | VIEW |
| Develop XX | Need to explain about cost to purchasing dept. due to the increase in cost. | Link to Memos | VIEW |
| Develop XX | Delivery of XX parts are delayed by 3 days. | Link to Memos | VIEW |

1302   1303

| PROJECT | DECISIONS | LINK | TRASE |
|---|---|---|---|
| Develop XX | Delete function XX from specification. Instead, add XX function. | Link to Memos | VIEW |
| Develop XX | XX division will evaluate XX evaluation boards and release the evaluation report by XX. | Link to Memos | VIEW |

FIG. 21

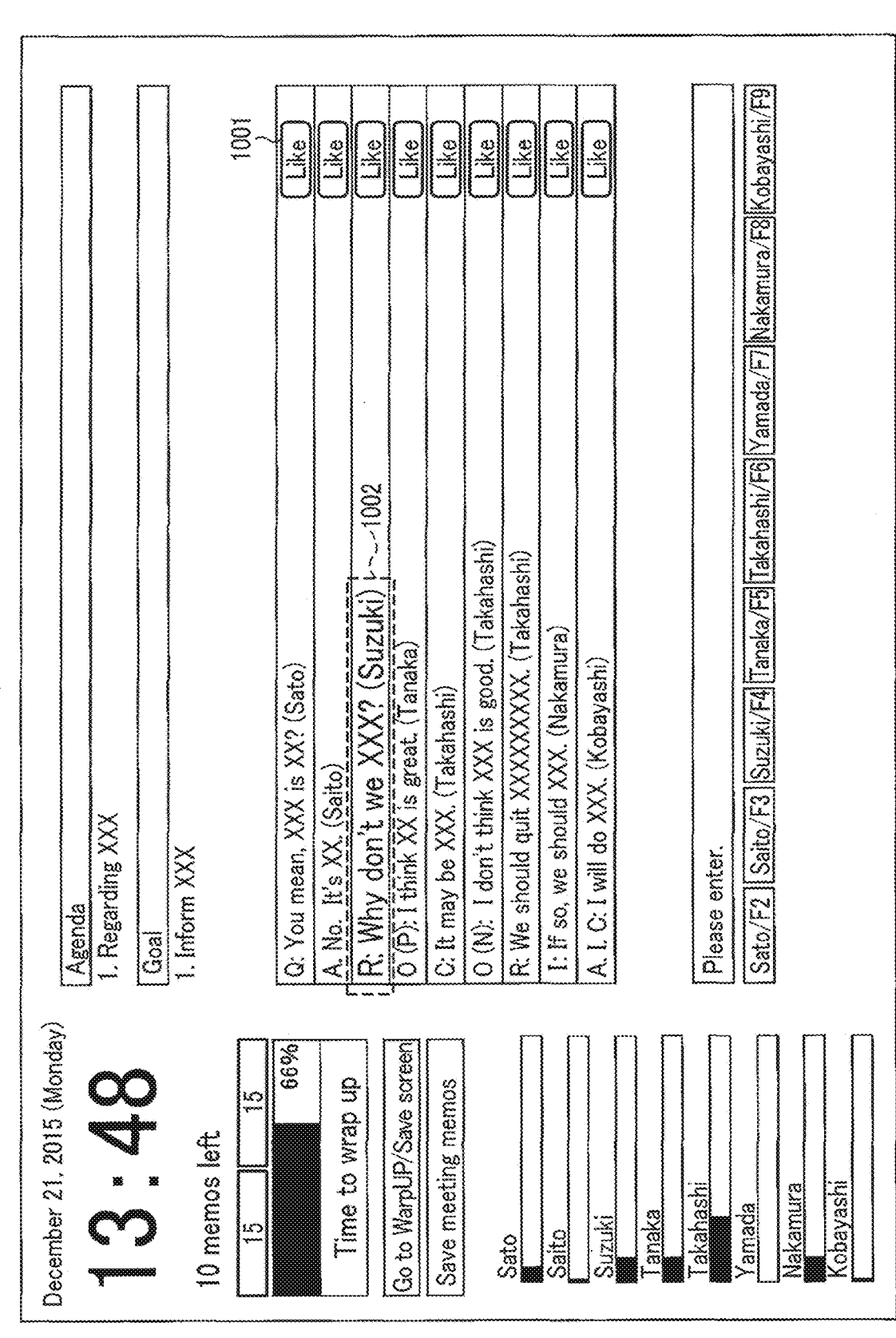

December 21, 2015 (Monday)

13:48

| 15 | 15 |
|---|---|
| | 66% |

Time to wrap up 10 memos left

Go to WarpUP/Save screen

Save meeting memos

Sato

Saito

Suzuki

Tanaka

Takahashi

Yamada

Nakamura

Kobayashi

Agenda
1. Regarding XXX

Goal
1. Inform XXX

1001

Q: You mean, XXX is XX? (Sato)          Like

A: No. It's XX. (Saito)          Like

R: Why don't we XXX? (Suzuki)     1002          Like

O (P): I think XX is great. (Tanaka)          Like

C: It may be XXX. (Takahashi)          Like

O (N): I don't think XXX is good. (Takahashi)          Like

R: We should quit XXXXXXXXX. (Takahashi)          Like

I: If so, we should XXX. (Nakamura)          Like

A. I. C: I will do XXX. (Kobayashi)          Like

Please enter.

| Sato/F2 | Saito/F3 | Suzuki/F4 | Tanaka/F5 | Takahashi/F6 | Yamada/F7 | Nakamura/F8 | Kobayashi/F9 |

FIG. 22

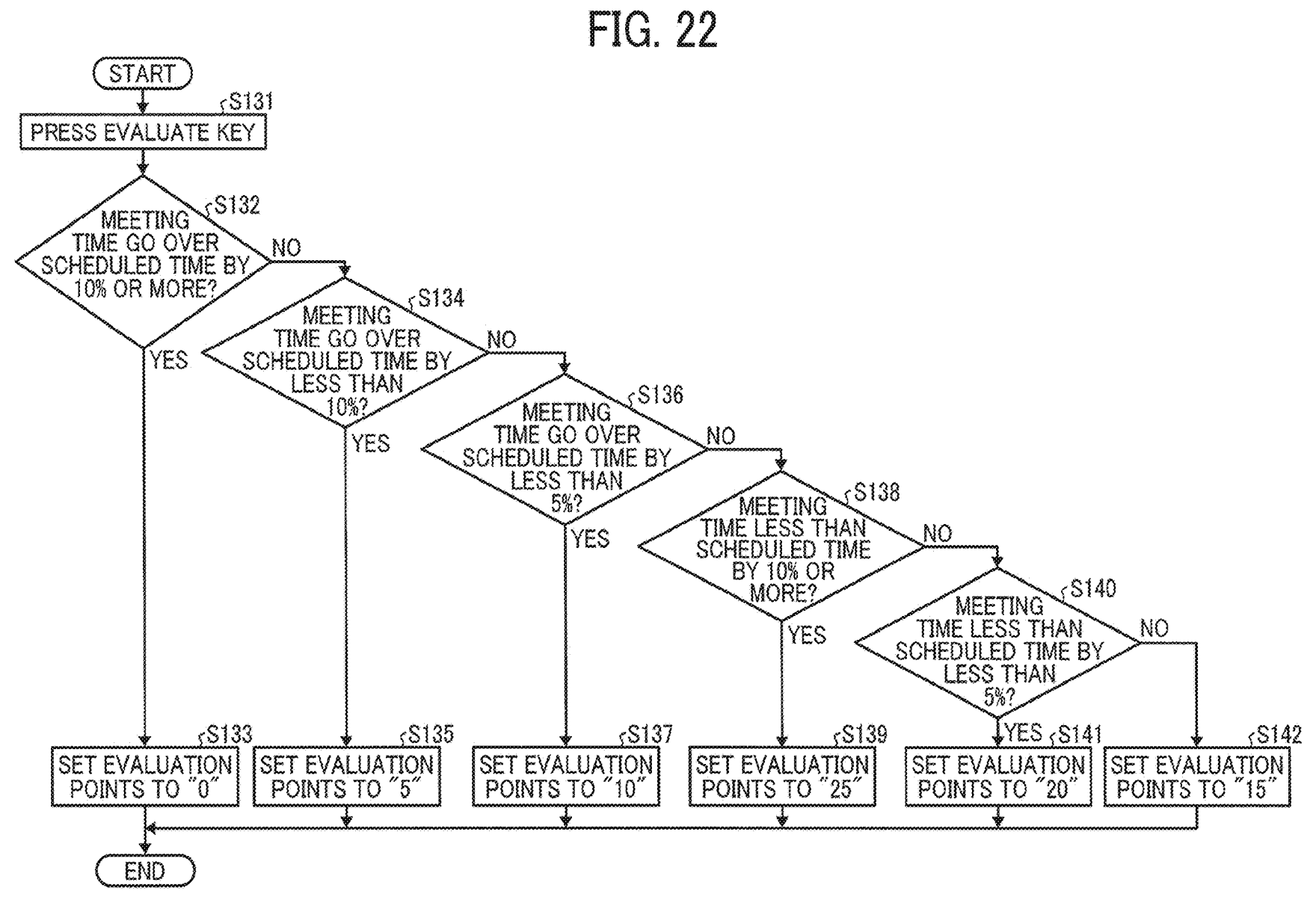

START

S131 PRESS EVALUATE KEY

S132 MEETING TIME GO OVER SCHEDULED TIME BY 10% OR MORE?

YES → S133 SET EVALUATION POINTS TO "0"

NO

S134 MEETING TIME GO OVER SCHEDULED TIME BY LESS THAN 10%?

YES → S135 SET EVALUATION POINTS TO "5"

NO

S136 MEETING TIME GO OVER SCHEDULED TIME BY LESS THAN 5%?

YES → S137 SET EVALUATION POINTS TO "10"

NO

S138 MEETING TIME LESS THAN SCHEDULED TIME BY 10% OR MORE?

YES → S139 SET EVALUATION POINTS TO "25"

NO

S140 MEETING TIME LESS THAN SCHEDULED TIME BY LESS THAN 5%?

YES → S141 SET EVALUATION POINTS TO "20"

NO → S142 SET EVALUATION POINTS TO "15"

END

APPARATUS, SYSTEM, AND METHOD OF ASSISTING INFORMATION SHARING, AND RECORDING MEDIUM

CROSS-REFERENCE TO RELATED APPLICATIONS

This application is a continuation Application of U.S. application Ser. No. 17/885,541, filed Aug. 11, 2022, which is a continuation Applications of U.S. application Ser. No. 17/111,565, filed Dec. 4, 2020 (now U.S. Pat. No. 11,461, 557), which is a continuation Applications of U.S. application Ser. No. 16/796,313, filed Feb. 20, 2020 (now U.S. Pat. No. 10,891,441), which is a continuation Applications of U.S. application Ser. No. 15/606,691, filed May 26, 2017 (now U.S. Pat. No. 10,614,162), which is based on and claims priority pursuant to 35 U.S.C. §119(a) to Japanese Patent Application Nos. 2016-106604, filed May 27, 2016 and 2017-074344, filed Apr. 4, 2017, in the Japan Patent Office. The entire contents of the above-identified applications are incorporated herein by reference.

BACKGROUND

Technical Field

The present invention generally relates to an apparatus, system, and method of assisting information sharing, and a non-transitory recording medium.

Description of the Related Art

A meeting assistance system has been introduced, which performs various administrative tasks to assist meeting participants, or a meeting moderator, in accomplishing a goal of the meeting or a goal commonly shared by multiple users.

SUMMARY

Example embodiments of the present invention include a system for assisting sharing of information includes circuitry to: input a plurality of sentences each representing a statement made by one of a plurality of users, the sentence being generated by speaking or writing during a meeting or by extracting from at least one of meeting data, email data, electronic file data, and chat data at any time; determine a statement type of the statement represented by each one of the plurality of sentences, the statement type being one of a plurality of statement types previously determined; select, from among the plurality of sentences being input, one or more sentences each representing a statement of a specific statement type of the plurality of types; and output a list of the selected one or more sentences as key statements of the plurality of sentences.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is an illustration of an example screen in an all-statement mode, displayed by the meeting assistance system, according to an embodiment;

FIG. 10 is an illustration of an example screen in an abstract mode, displayed by the meeting assistance system, according to an embodiment;

FIG. 14 is an illustration of an example screen with a list of statements each having a specific type, displayed by the meeting assistance system, according to an embodiment;

FIG. 21 is an illustration of an example screen for inputting a subjective evaluation, displayed by the meeting assistance system of FIG. 18, according to an embodiment;

FIG. 22 is a flowchart illustrating operation of evaluating a meeting based on information regarding a meeting time, performed by the meeting assistance system, according to an embodiment;

FIG. 23 is a conceptual diagram illustrating natural language processing based on machine learning, performed by the meeting assistance system, according to an embodiment;

FIG. 27 is a schematic block diagram illustrating a configuration of an information sharing assistance system, according to an embodiment.

Figure 1:
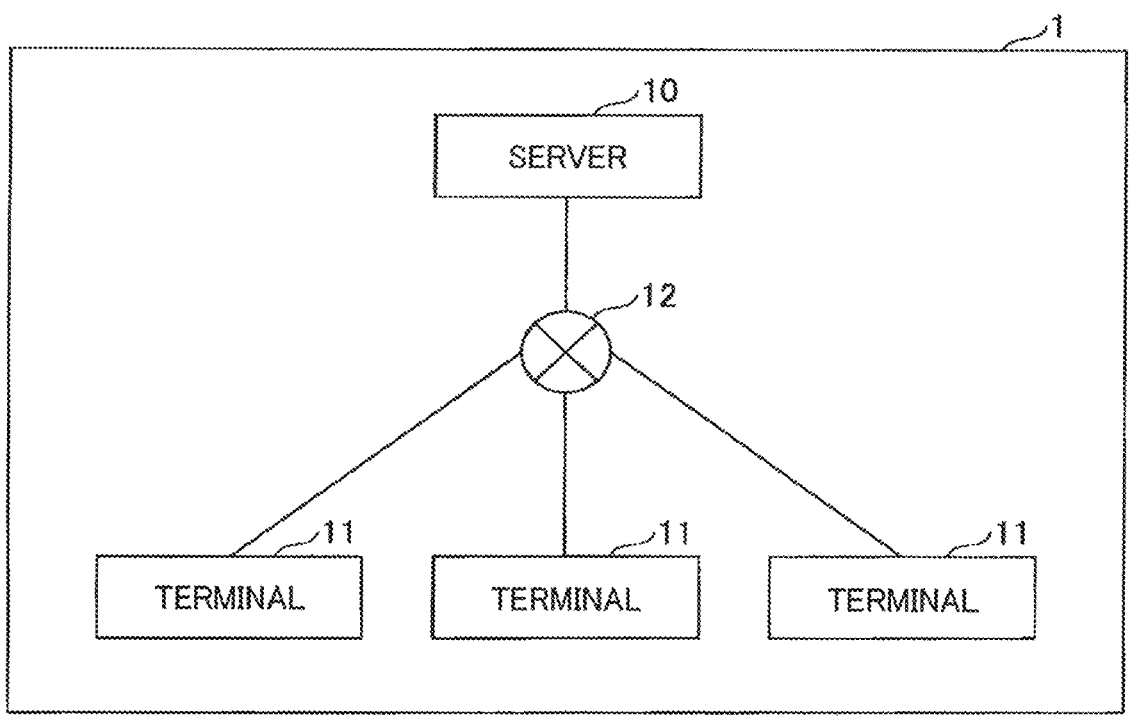
FIG. 1 is a schematic diagram illustrating an overall configuration of a meeting assistance system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present invention are described. In one or more embodiments described below, information at a meeting is shared in real time or circulated after the meeting among users such as meeting participants. In the meeting, a meeting assistance system, which is one example of information sharing assistance system, is applied. In the following, one or more sentences (referred to as the "sentence") input to the meeting assistance system represent a statement of each participant at the meeting. In this disclosure, one sentence is considered as a minimum unit of content representing one's thoughts, feelings, or statement. For simplicity, thoughts, feelings, or statement of the meeting participants is collectively referred to as a statement.

(Overview)

The meeting assistance system has been introduced to perform administrative tasks such as keeping time and generating meeting memos, to help the meeting participants to focus on discussions to effectively reach a decision to accomplish a goal of the meeting. However, just keeping time or taking notes does not always contribute to the effective meeting, unless the meeting participants, now free from such administrator works, have constructive comments that lead to accomplishment of the goal. In view of this, the meeting assistance system visualizes a content or a flow of discussions, in a manner that can be easily grasped by the meeting participants.

Further, it is often that discussions are continuously being made before or after the meeting, among various users including other users who do not always attend the meeting. In view of this, the information sharing assistance system, which includes the meeting assistance system, is provided to keep a record of information exchanged among the users, organize such information, and visualize such information, to assist multiple users to accomplish a goal commonly shared by the multiple users.

(System Configuration)

FIG. 1 is a schematic diagram illustrating an overall configuration of a meeting assistance system 1 according to an embodiment. For example, the meeting assistance system 1 includes a server 10 as an example of an information sharing assistance apparatus, and one or more terminals 11. The server 10 and each of the terminals 11 is connected through a network 12. The server 10 and the terminal 11 may each be implemented by an information processing apparatus such as a general-purpose personal computer.

(Hardware Configuration)

Figure 2:
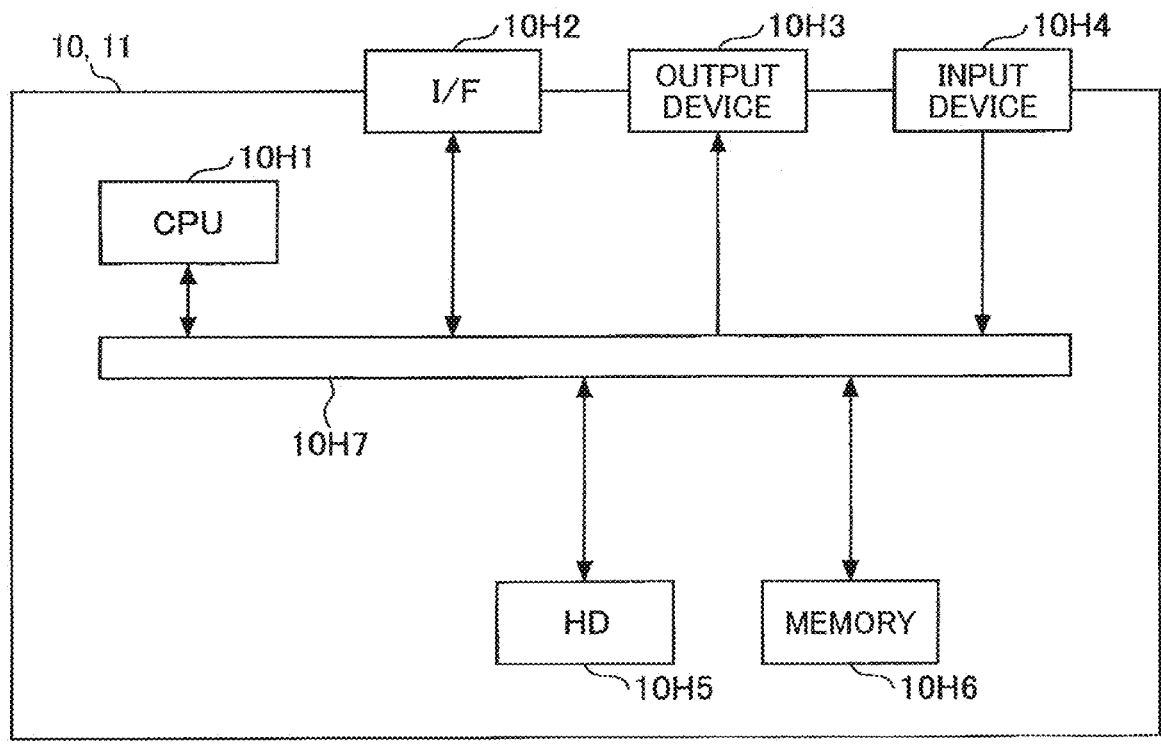
FIG. 2 is a schematic block diagram illustrating a hardware configuration of an information processing apparatus in the meeting assistance system according to an embodiment.

FIG. 2 is a schematic block diagram illustrating a hardware configuration of the information processing apparatus according to an embodiment. For example, the information processing apparatus, such as the server 10 and the terminal 11, includes a central processing unit (CPU) 10H1, an interface (I/F) 10H, and an output device 10H3. The information processing apparatus further includes an input device 10H4, a hard disk (HD) 10H5, and a memory 10H6. The above-described hardware components are connected through a bus 10H7. The hardware configurations of the server 10 and the one or more terminals 11 may be the same or different from each other. For the descriptive purposes, the following assumes that the server 10 and the terminals 11 have the same hardware configuration. Description of the hardware configuration in the case of the server 10 is described as an example.

The CPU 10H1 is a processor, which performs calculation to execute various processing, such as editing of various data, and control of hardware components. The server 10 may include a plurality of CPUs.

The I/F 10H2 is, for example, a connector and a processing integrated circuit (IC). For example, the I/F 10H2 transmits or receives various data with an external device through a network.

The output device 10H3 is, for example, any type of display capable of displaying a display screen and a graphical user interface (GUI), such as a liquid crystal display (LCD).

The input device 10H4 allows a user to input an instruction, and may be implemented by any one or any combination of a touch panel, keyboard, mouse, and microphone. As the microphone, a directional microphone capable of detecting a source of sounds is preferably used.

The HD 10H5 is one example of an auxiliary memory. The HD 10H5 stores programs for executing processing, files, or various configuration data.

The memory 10H6 is any type of memory. The memory 10H6 stores various programs or data, read from the HD 10H5.

(Functional Configuration)

Figure 3:
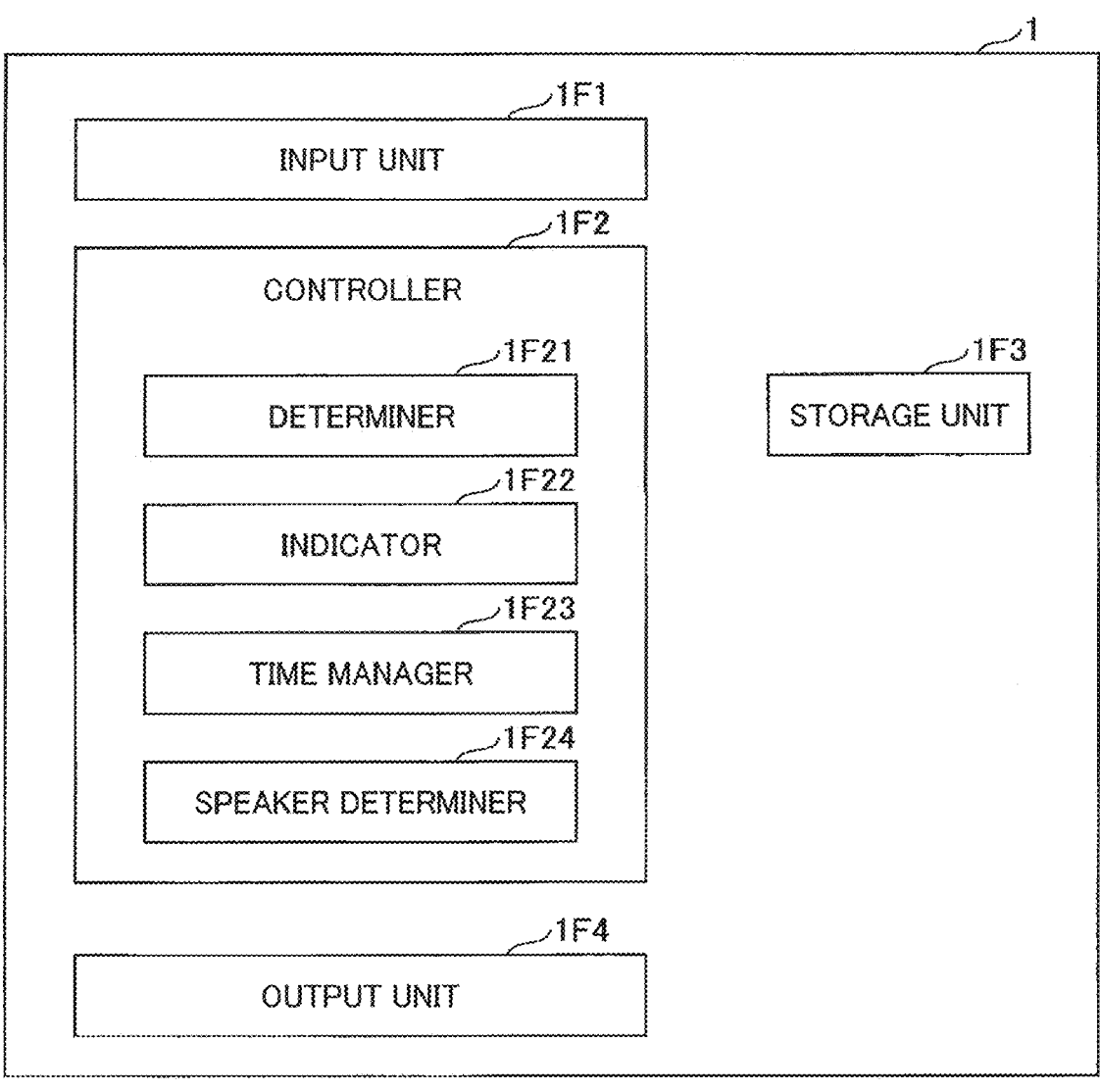
FIG. 3 is a schematic block diagram illustrating a functional configuration of the meeting assistance system of FIG. 1, according to an embodiment.

FIG. 3 is a schematic block diagram illustrating a functional configuration of the meeting assistance system 1 according to the embodiment. For example, the meeting assistance system 1 includes an input unit 1F1, a controller 1F2, a storage unit 1F3, and an output unit 1F4.

For example, in the meeting assistance system 1, the input unit 1F1 and the output unit 1F4 correspond to functions performed by the terminal 11 of FIG. 1. The controller 1F2 and the storage unit 1F3 are functions performed by the server 10 of FIG. 1. In alternative to the above-described embodiment, any one of the above-described functions may be performed by any combination of the terminal 11 and the server 10.

The input unit 1F1 inputs a statement made by a meeting participant. The input unit 1F1 may be implemented by the input device 10H4 of the server 10 or terminal 11 illustrated in FIG. 2.

The controller 1F2 controls execution of each processing. More specifically, the controller 1F2 includes a determiner 1F21. As illustrated in FIG. 3, the controller 1F2 may further include an indicator 1F22, a time manager 1F23, and a speaker determiner 1F24. For example, the controller 1F2 may be implemented by the CPU 10H1 of the server 10 or the terminal 11 of FIG. 2.

The storage unit 1F3 stores various data previously input. The storage unit 1F3, in one example, functions as various databases. For example, the storage unit 1F3 stores information regarding statements of meeting participants. For example, the storage unit 1F3 may be implemented by the HD 10H5 and the memory 10H6 of the server 10 or the terminal 11 of FIG. 2. More specifically, in one example, the storage unit 1F3 stores, in any desired memory, all the statements input to the meeting assistance system 1, in association with information relating to the statements such as a time of input, a statement type, a speaker who made such statement, etc.

The output unit 1F4 outputs meeting contents to the meeting participants. For example, the output unit 1F4 displays or prints meeting memos or notes, an evaluation result of the meeting, a meeting summary, statements made by meeting participants, or a determination or decision made for the meeting. For example, the output unit 1F4 may be implemented by the output device 10H3 of the server 10 or the terminal 11 illustrated in FIG. 2.

In the meeting assistance system 1, the input unit 1F1 inputs a statement made by a meeting participant who made such statement (speaker) or a meeting moderator. In one example, the statement may be input in the form of text using such as a keyboard. In such case, after a speech statement is made by a participant, such statement may be input as text using the keyboard by another person. In case of an online meeting held between remotely located sites, the participant may enter such statement as a chat message. That is, the statement does not only include a speech statement, but also include any text statement input by such as a key board.

In case the statement is made by speaking, the statement may be input through a microphone. More specifically, the meeting assistance system 1 captures voices of the participant as audio data, and converts the audio data into text data. For example, a statement made by a meeting participant is captured at a microphone (input device 10H4) at the terminal 11 as audio, and converted from audio to text, and transmitted to the server 10. In another example, the terminal 11 may transmit the statement, which is captured at the terminal 11, to the server 10 as audio. The server 10 converts the audio to text for storage. In another example, a statement made by a meeting participant is captured at one of microphones provided in a meeting room, for input to the server 10 of the meeting assistance system 1.

In another example, the statement may be input by writing, such as by writing of the participant on an electronic whiteboard or a tablet. In such case, the meeting assistance system 1 recognizes the writing on the electronic whiteboard, with optical character recognition (OCR), and converts writing data into text data.

In another example, the input unit 1F1 may input, to the meeting assistance system 1, at least a part of content written in email data as statement. In this way, the content of email can be shared among the meeting participants. In such case, the input unit 1F1 inputs the content of email data in the form of text data. In alternative to the text data, any statement, which is represented by one or more sentences, may be input in any other data format such as in the form of document data.

In another example, the input unit 1F1 may input data representing a report such as a daily report. In such case, the report may be input in the form of text data, data generated with a web application, or data that is converted from writing data by OCR.

In this disclosure, the speaker determiner 1F24 specifies a speaker from among the meeting participants. In such case, the speaker determiner 1F24 determines from which direction the voices of each meeting participant come from using a plurality of directional microphones. Based on association between each meeting participant and the direction of a source of sound, the speaker determiner 1F24 specifies at least one speaker who is currently speaking at the meeting. Alternatively, the speaker determiner 1F24 may analyze voices of each meeting participant using, for example, authentication data for each meeting participant. Alternatively, the speaker determiner 1F24 may capture each meeting participant with such as a camera connected to the network 12 (FIG. 1). The speaker determiner 1F24 can then analyze the captured image of each participant to determine a speaker of the statement.

In another example, the input unit 1F1 may input any information indicating a speaker of the statement. For example, a plurality of function keys ("F1" to "F12") of the keyboard may be associated respectively with the meeting participants. When inputting the statement of a specific participant by the keyboard, one of the function keys is pressed, before or after such statement is input. The input statement is then associated with information indicating a specific participant who is previously associated with a specific function key. Accordingly, the statement is associated with a speaker of that statement.

When content of email data is shared, a speaker of such statement (content) may be obtained from the FROM field (sender) and/or the TO field (receiver) of a header of the email data.

In the meeting assistance system 1, the determiner 1F21 determines a type of the statement being input. Examples of statement types include, but not limited to, "proposal (R)", "question (Q)", "answer (A)", "positive opinion (O(P))", "negative opinion (O(N))", "neutral opinion (O(E))", "comment (C)", "request (RE)", "issue (I)", "action item (A.I.)", and "decision (D)". In the following, each statement being input is determined to have one of the above-described statement types.

The storage unit 1F3 of the meeting assistance system 1 stores expressions that are previously defined for each statement type. In this disclosure, the expression is a word, phrase, or sentence, which is used to convey one's thoughts or feelings as a statement. The statement type and one or more expressions that are often used to convey a statement of that type are stored in association with each other. Once the input unit 1F1 inputs a sentence representing a statement, the determiner 1F21 determines whether the input sentence includes any expression stored in the storage unit 1F3. When the storage unit 1F3 determines that any expression is stored, the determiner 1F21 determines a statement type of the input sentence, which is associated with the stored expression. In this way, the meeting assistance system 1 determines a statement type of the sentence.

The indicator 1F22 adds an indication of a statement type that is determined by the determiner 1F21, to the statement made by the meeting participant. Further, as described below, the indicator 1F22 adds information identifying a speaker.

The output unit 1F4 outputs a list of meeting contents. For example, the output unit 1F4 may display the statement made by a meeting participant, with indication of a statement type that is determined by the determiner 1F21.

(Example of Input and Output)

In one example, the meeting assistance system 1 controls to display various types of screens as described below.

Figure 4:
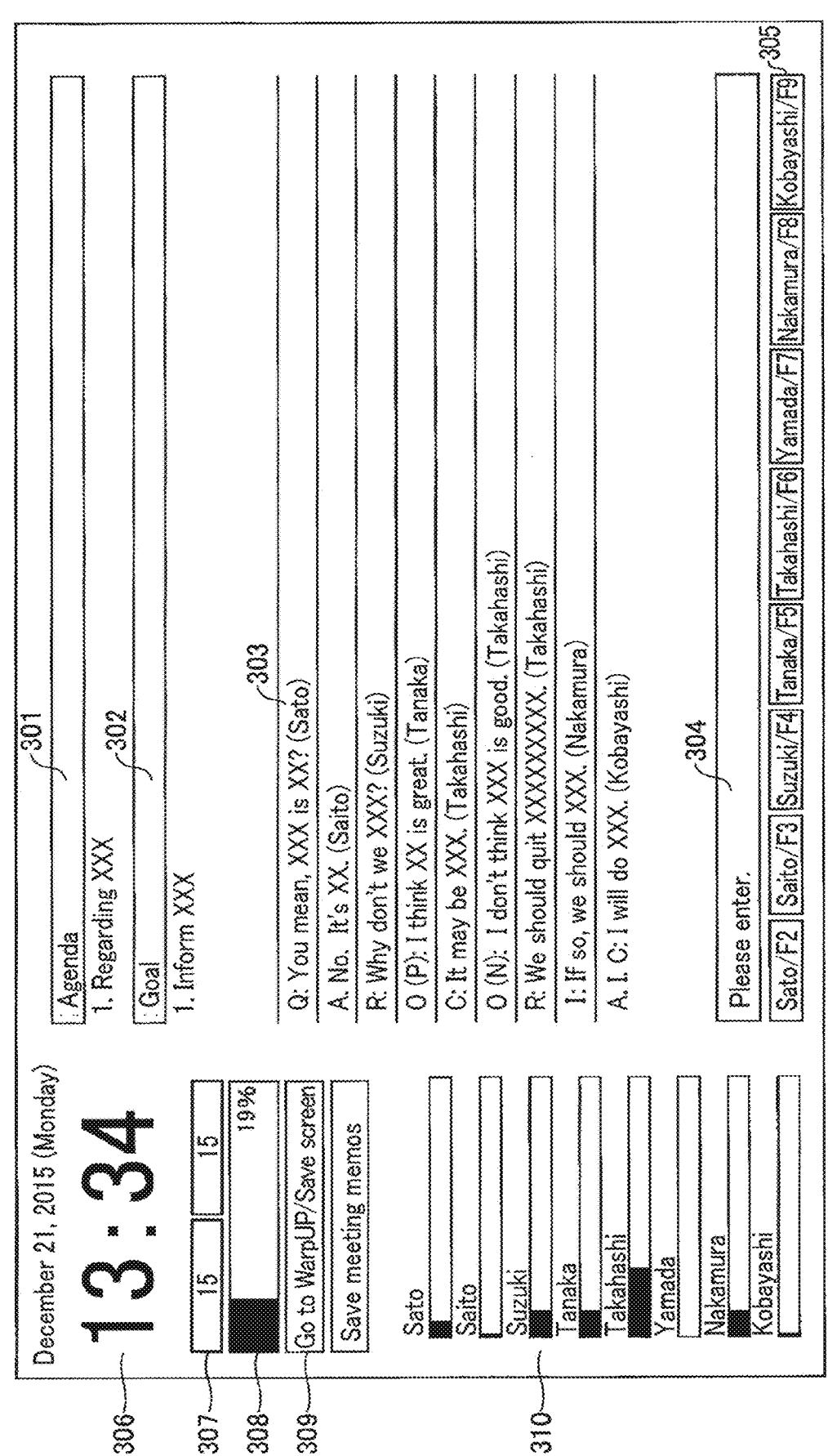
FIG. 4 is an illustration of an example screen displayed by the meeting assistance system, according to an embodiment.

FIG. 4 illustrates an example screen displayed by the meeting assistance system 1, according to an embodiment. The screen illustrated in FIG. 4, which may be displayed at each terminal 11 during the meeting, includes various graphical user interface (GUI) components as described below.

In this embodiment, the output unit 1F4 displays, on the screen of FIG. 4, an agenda 301, and a goal 302 corresponding to a meeting objective. Display of the agenda 301 and the goal 302, help all meeting participants to focus on the agenda or goal during discussion. Thus, the meeting assistance system 1 is able to prevent the meeting participants from addressing off-topic statements. The agenda 301 and the goal 302 are previously set before the meeting or at the start of meeting, for example, as described below.

Figure 5:
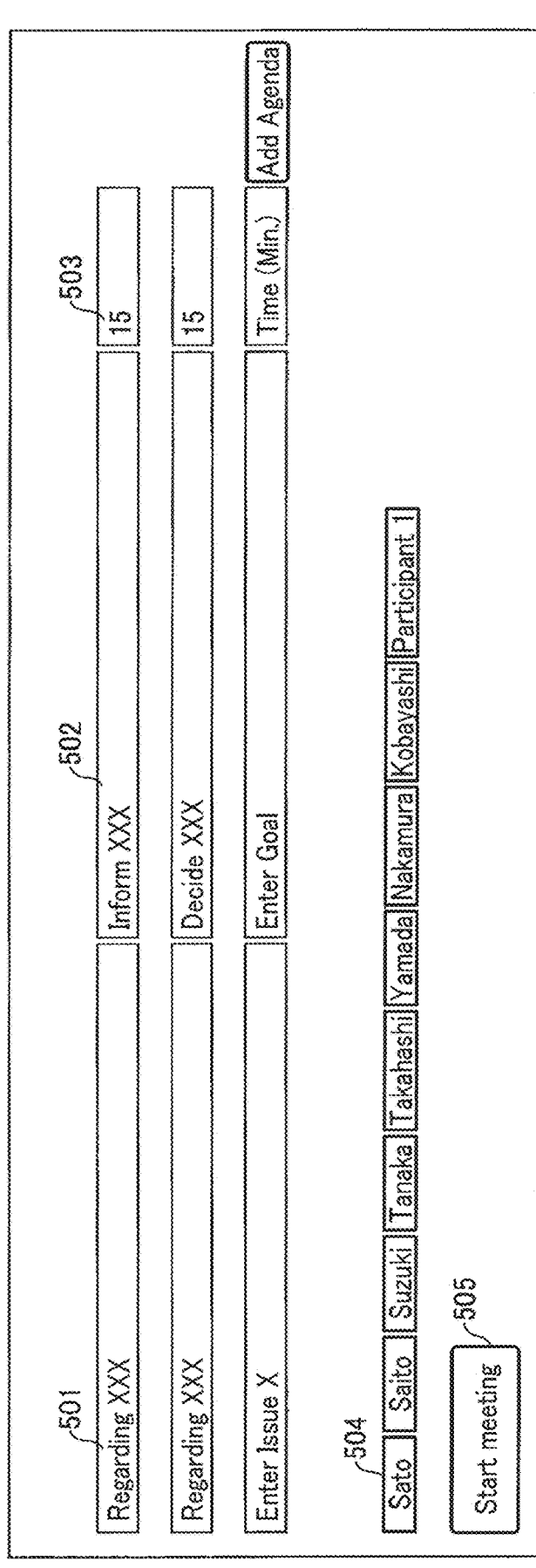
FIG. 5 is an illustration of an example screen for configuring information relating to a meeting, displayed by the meeting assistance system, according to an embodiment.

FIG. 5 illustrates a configuration screen to be used for setting an agenda and a goal of a meeting, according to an embodiment. The meeting assistance system 1 displays the configuration screen illustrated in FIG. 5, for example, at the start of meeting. After various information is input on the configuration screen of FIG. 5, with pressing of a start key 505, information that is input is set. That is, with pressing of the start key 505, the meeting assistance system 1 displays the screen illustrated in FIG. 4 based on the configured information.

As illustrated in FIG. 5, the configuration screen includes an agenda text box 501 for inputting an agenda. For each agenda entered in the agenda text box 501, one or more goals are entered in, for example, goal text boxes 502. The meeting assistance system 1 displays the agenda 301 and the goal 302 illustrated in FIG. 4, based on the agenda in the text box 501 and the goal in the text box 502.

In some cases, a notification may be sent to each meeting participant beforehand, to inform each participant about the meeting. In such case, the agenda and the goal are usually included in such notification. The meeting assistance system 1 may display the agenda 301 and the goal 302, based on information extracted from the notification. If the notification about a content of the meeting is circulated beforehand, the meeting participants are able to prepare for meeting, thus improving effectiveness in discussion during the meeting. In some cases, not all of the users who are scheduled to attend the meeting need to attend, depending on the agenda of the meeting. If the agenda is circulated beforehand, some users may choose not to attend the meeting, thus preventing participation to the meeting that the users do not have to attend.

Referring back to FIG. 4, the screen further includes a current time 306, a time allocation 307, and a meeting progress 308. The current time 306 is displayed, based on current time data that is obtained, for example, through a network. The time allocation 307 indicates a time that is previously scheduled for each agenda or goal. For example, referring to FIG. 5, the scheduled time may be entered in a scheduled time text box 503 for each agenda or goal. The meeting progress 308 displays an indication of a meeting time, based on a meeting start time and the current time 306, for example, in the form of a progress bar.

The time manager 1F23 and the output unit 1F4 (FIG. 3) may perform the following operation. For example, when the current time almost reaches a scheduled end time of the entire meeting or a specific agenda or goal, the meeting assistance system 1 may display a remaining time or an alert message. For example, in the example case of the screen illustrated in FIG. 4, a remaining time and an alert message may be displayed as illustrated in FIG. 6.

Figure 6:
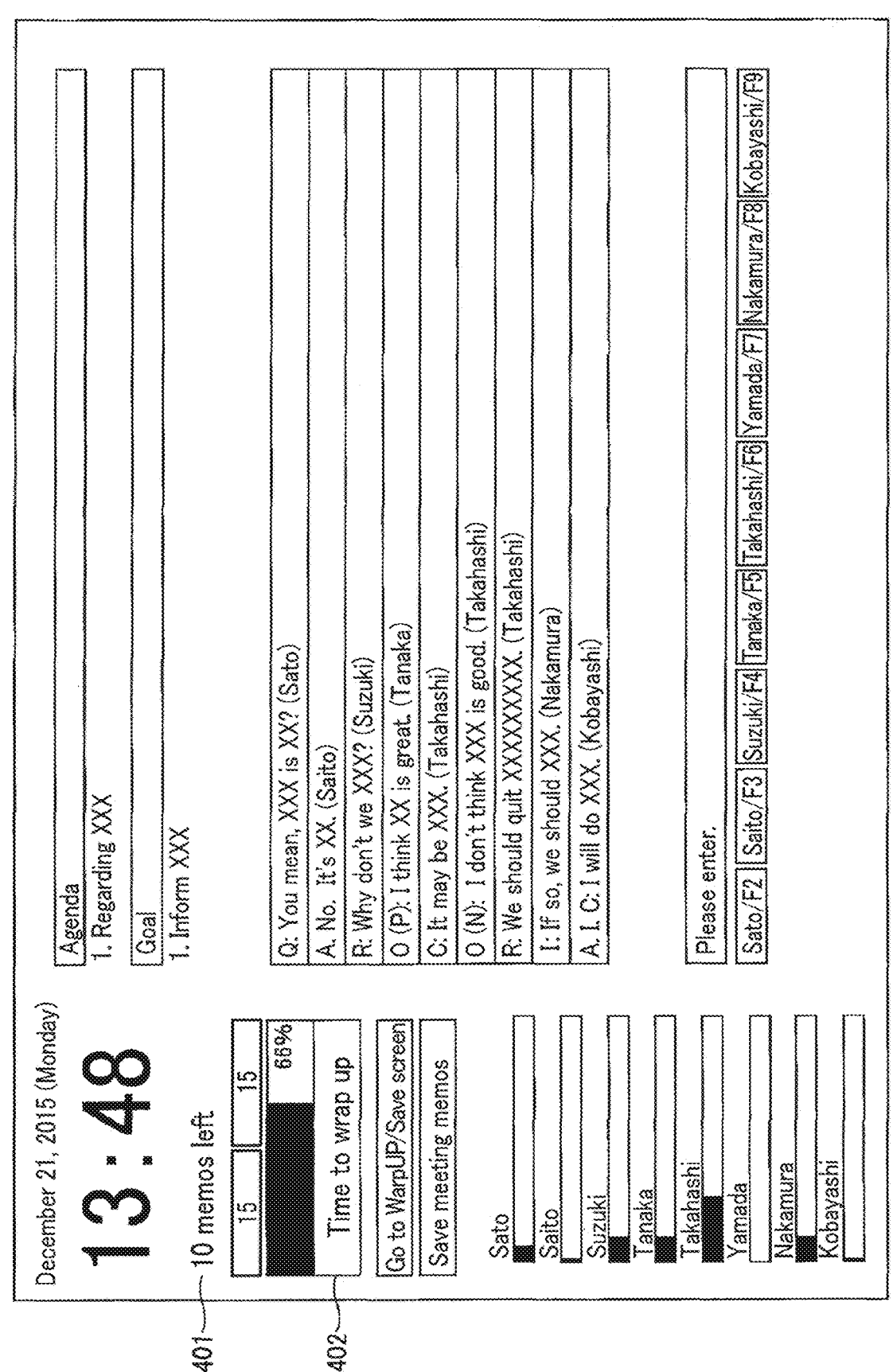
FIG. 6 is an illustration of an example screen with an alert and a remaining time, displayed by the meeting assistance system, according to an embodiment.

FIG. 6 illustrates an example screen displayed by the meeting assistance system 1, with a remaining time and an alert message, according to an embodiment. As illustrated in FIG. 6, the meeting assistance system 1 displays a remaining time 401 and an alert message 402. In FIG. 6, the remaining time 401 indicates that a time from the current time to the scheduled end time of the entire meeting is equal to or less than 10 minutes. The alert message 402 is an example message, which recommends the meeting participants to wrap up the meeting, as there is only a limited amount of time left. With this alert message 402, the meeting participants become more aware of a need for taking time to summarize the meeting before the meeting ends. The meeting participants tend to forget to keep the time, as they focus on discussions. In such case, the meeting participants just end the meeting as the meeting time runs out, without reviewing the decision or action items that have been decided at the meeting. The display of the alert message 402 encourages the meeting participants to follow up the decision or action items, before the meeting ends.

The alert message 402 or the indication of the remaining time 401 does not have to be displayed, as long as such information is notified to the user. For example, such information may be output as audio.

The screen of FIG. 4 further displays a plurality of statements 303. Each statement 303 is displayed with an indication of a statement type, which is determined by the determiner 1F21 (FIG. 3). For example, as illustrated in FIG. 4, each statement is displayed with an indication of a specific statement type for that statement, which is added right before or after the sentence representing that statement. Examples of such indications of statement types include: "Q:", "A:", "R:", "O(P):", "O(N):", "C:", "I:", and "A.I.:". The indication of each statement type is not only limited to the example case illustrated in FIG. 4, as long as it helps the meeting participants to recognize a statement type. For example, the statement type may be made distinguishable in terms of color, effect such as italic or bold, font type, etc. of the statement, or addition of a text or a mark before or after the sentence, or any combination thereof. The indication type may be previously set with the meeting assistance system 1. More specifically, the "positive opinion" statement may be displayed in blue, with the letter "O(P)" in front of the statement. The "negative opinion" statement may be displayed in red, with the letter "O(N)" in front of the statement. The "issue" statement may be displayed in red, with the letter "I" in front of the statement. With the indication of a specific statement type, the meeting participants or any user is able to instantly recognize the key issues, a content of discussions, or a tendency of discussions, during the meeting. This indication of each statement type may be processed at the server 10, or a browser installed on each terminal 11.

If the speaker of each statement can be identified, as illustrated in FIG. 4, the meeting assistance system 1 additionally displays information regarding the speaker, for each statement. In this example, the name of the speaker is displayed in parenthesis at the end of each sentence. The information regarding the speaker may be displayed in any other format. Any candidate of a speaker, that is, the meeting participants, may be previously entered in participant text boxes 504 on the screen of FIG. 5. The meeting participants that have been entered in the participant text boxes 504 may be displayed, as the participant display areas 305 on the screen illustrated in FIG. 4.

In this example, a specific function key is associated with each meeting participant displayed on the participant display area 305. If one meeting participant "Satoh" speaks, the statement made by "Satoh" is entered in the input text box 304 while the function key "F2" is being pressed. In this way, the input statement is associated with "Satoh" represented by the function key "F2". That is, the statement is entered in the input text box 304 while the function key "F2" is being pressed, to associate the input statement with the speaker. The meeting assistance system 1 displays the input statement with an indication of "Satoh".

The statement type of each sentence is determined as described below. The following describes the example case in which the statement types are "question", "answer", "proposal", "issue", and "opinion".

Figure 7:
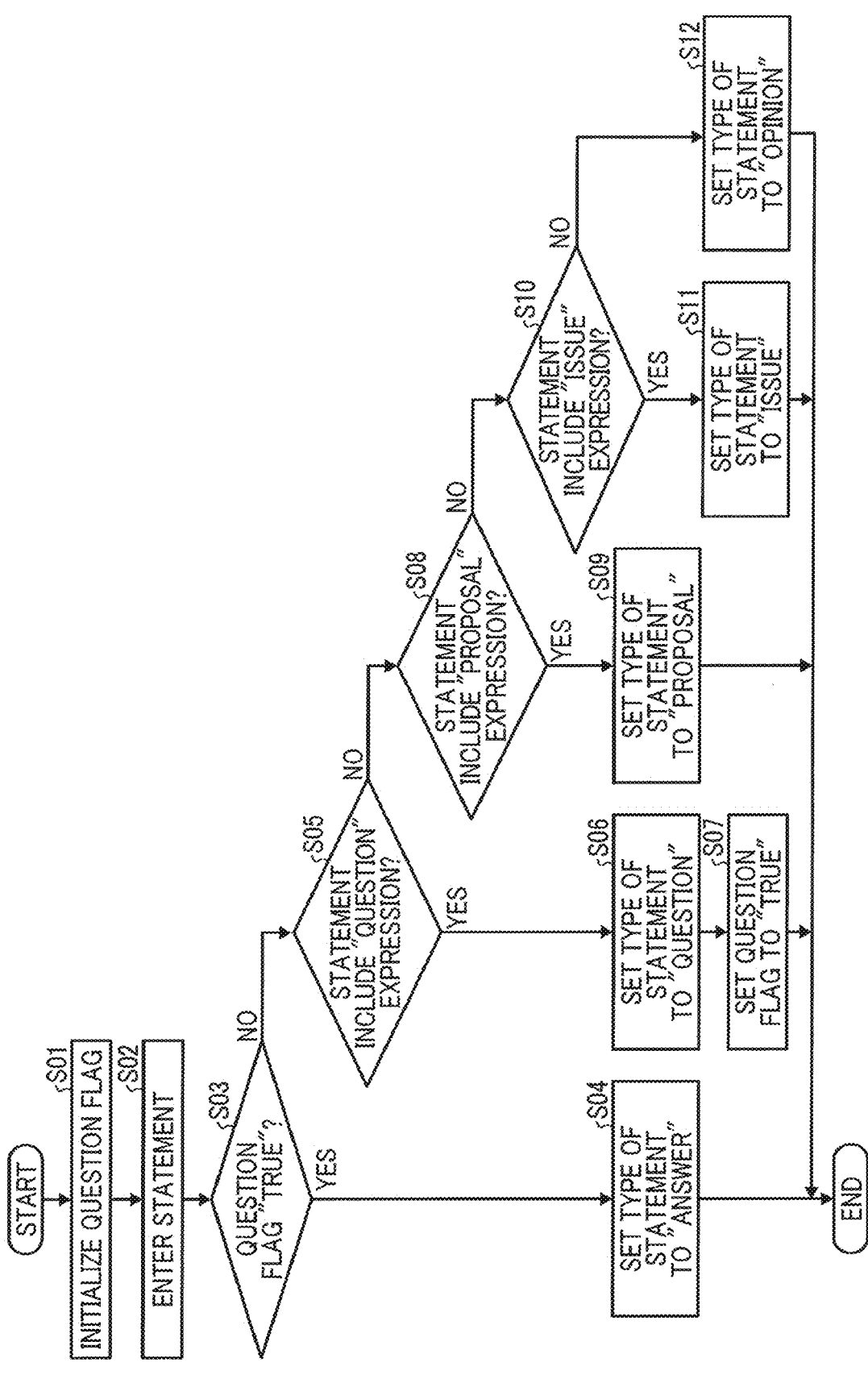
FIG. 7 is a flowchart illustrating operation of determining a type of statement input to the meeting assistance system, performed by the meeting assistance system, according to an embodiment.

FIG. 7 is a flowchart illustrating operation of determining a statement type, performed by the meeting assistance system 1, according to an embodiment. In this disclosure, the statement includes not only the speech content, but also the written content such as a sentence extracted from electronic mail or chat data. The operation of FIG. 7 may be performed by the CPU 10H1 of the server 10 according to a control program to operate as the determiner 1F21.

At S01, the meeting assistance system 1 initializes a question flag. More specifically, the meeting assistance system 1 sets the question flag to "false". In this example, the question flag indicates whether a type of the statement that is input is a "question". When the question flag is "false", the statement that is input has a statement type other than the question. When the question flag is "true", the statement that is input has a statement type that is the question.

At S02, the meeting assistance system 1 inputs the statement. More specifically, the input unit 1F1 (FIG. 3) of the meeting assistance system 1 inputs the statement. Referring to FIG. 4, in one example, each statement is entered into a statement text box 304 in the form of text.

At S03, the meeting assistance system 1 determines whether the question flag is "true". When it is determined that the question flag is "true" ("YES" at S03), the operation proceeds to 504. On the other hand, when it is determined that the question flag is not "true", but "false" ("NO" at S03), the operation proceeds to S05.

At S04, the meeting assistance system 1 determines that the statement has a statement type that is the "answer". The "answer" is any statement, which is made in response to the statement that is the "question". For this reasons, the "answer" statement is assumed to have any expressions. That is, it would be almost impossible to determine whether the statement is an answer based on its expressions alone. In view of this, as described above referring to S03, the meeting assistance system 1 determines whether a statement that is just before the target statement is a question by referring to the value of its question flag. Based on the question flag for the previous statement, the meeting assistance system 1 determines whether the target statement is an answer to the previous question. When the previous statement has a statement type that is the "question", the meeting assistance system 1 determines that the next statement that just follows the "question" statement has a statement type that is the "answer". On the other hand, when the previous statement has a statement type that is not the "question", the meeting assistance system 1 determines that the next statement that just follows the non-question statement has a statement type that is not the "answer". In this way, the meeting assistance system 1 determines whether the target statement is the answer or not. At S04, the meeting assistance system 1 sets the question flag to "false".

At S05, the meeting assistance system 1 determines whether the statement includes any expression as "question". For example, the meeting assistance system 1 analyzes an auxiliary verb of the sentence representing the statement, to determine whether the statement is a question. For example, the storage unit 1F3 (FIG. 3) previously stores expressions such as "?", "Is . . . ?", "Isn't . . . ?", as expressions indicating the question. The determiner 1F21 (FIG. 3) determines whether the statement (sentence) that is input by the input unit 1F1 matches entirely or partially to the stored expressions. That is, determination is made based on pattern matching.

Next, when it is determined that the statement has the "question" statement type at S05 ("YES" at S05), the operation proceeds to S06. On the other hand, when it is determined that the statement does not have the "question" statement type at S05 ("NO" at S05), the operation proceeds to S08.

At S06, the meeting assistance system 1 determines that the statement has a statement type that is "question".

At S07, the meeting assistance system 1 sets the question flag to "true".

At S08, the meeting assistance system 1 determines whether the statement includes any expression as "proposal". For example, as described above for the case of determining the "question" statement, the meeting assistance system 1 analyzes an auxiliary verb of the sentence representing the statement, to determine whether the statement is a proposal. For example, the storage unit 1F3 (FIG. 3) previously stores expressions such as "should", "better", as expressions indicating the proposal. The determiner 1F21 (FIG. 3) determines whether the statement (sentence) that is input by the input unit 1F1 matches entirely or partially to the stored expressions.

Next, when it is determined that the statement has the "proposal" statement type at S08 ("YES" at S08), the operation proceeds to S09. On the other hand, when it is determined that the statement does not have the "proposal" statement type at S08 ("NO" at S08), the operation proceeds to S10.

At S09, the meeting assistance system 1 determines that the statement has a statement type that is "proposal".

At S10, the meeting assistance system 1 determines whether the statement includes any expression as "issue". For example, as described above for the case of determining the "question" statement, the meeting assistance system 1 analyzes an auxiliary verb of the sentence representing the statement, to determine whether the statement is an issue. For example, the storage unit 1F3 (FIG. 3) previously stores expressions such as "need", "must", etc., as expressions indicating the issue. The determiner 1F21 (FIG. 3) determines whether the statement (sentence) that is input by the input unit 1F1 matches entirely or partially to the stored expressions.

Next, when it is determined that the statement has the "issue" statement type at S010 ("YES" at S10), the operation proceeds to S11. On the other hand, when it is determined that the statement does not have the "issue" statement type at S10 ("NO" at S10), the operation proceeds to 12.

At S11, the meeting assistance system 1 determines that the statement has a statement type that is the "issue".

At S12, the meeting assistance system 1 determines that the statement has a statement type that is the "comment".

As described above, S02 to S12 are repeated for each statement as a target for determining a statement type. Through the above-described operation, the meeting assistance system 1 is able to determine a type of each statement using pattern matching.

The meeting assistance system 1 stores, for each statement that is input, the determined statement type, information identifying the meeting participant, and time information indicating the time when the statement is input, in any desired memory (storage unit 1F3). Referring to this information, the meeting assistance system 1 displays, through the output unit 1F4, the screen of FIG. 4, for example, which includes a list of statements.

The information regarding the meeting may be displayed in various ways other than the screen illustrated in FIG. 4.

In one example, the meeting assistance system 1 may alternatively display an abstract of all statements that have been input. For example, the meeting assistance system 1 may switch a display between the abstract mode and the all-statement mode as described below.

FIG. 8 illustrates an example screen displayed by the meeting assistance system 1, in the all-statement mode, according to an embodiment. The screen of FIG. 8 may be displayed at any time during the meeting. When the abstract instruction key BN1 illustrated in FIG. 8 is selected by a meeting participant, the meeting assistance system 1 switches to display the screen in the abstract mode.

Figure 9:
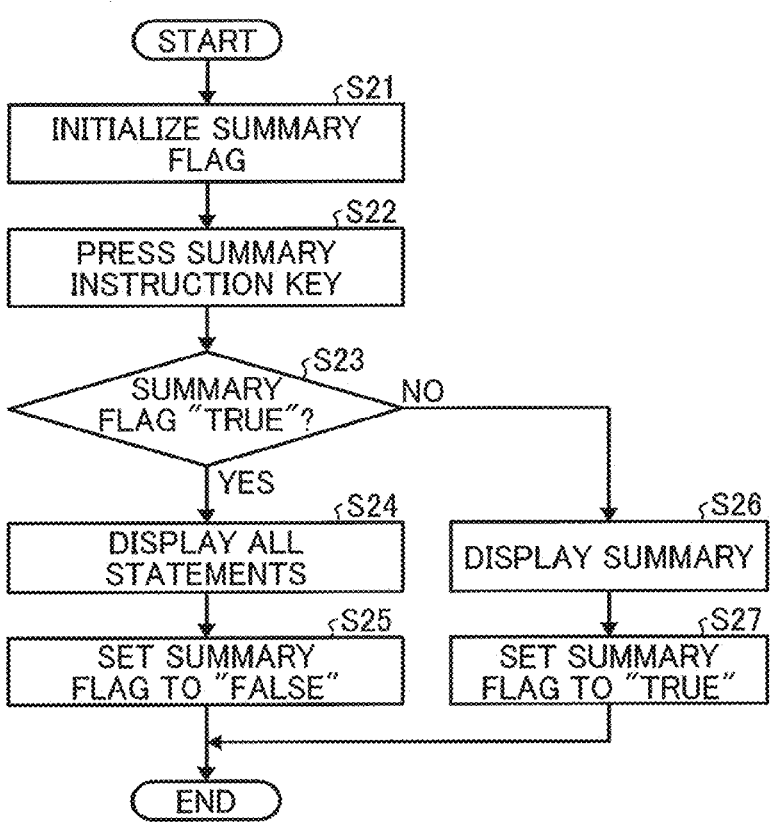
FIG. 9 is a flowchart illustrating operation of controlling switching between an all-statement mode and an abstract mode, performed by the meeting assistance system, according to an embodiment.

FIG. 9 is a flowchart illustrating operation of switching a display between the abstract mode and the all-statement mode, performed by the meeting assistance system 1, according to an embodiment. The operation of FIG. 9 may be performed by the controller 1F2 (such as the determiner 1F21), which operates with the input unit 1F1 and the output unit 1F4. The meeting assistance system 1 may generate a screen in the abstract mode as described below. In the following, it is assumed that the statement types include "proposal (R)", "question (Q)", "answer (A)", "positive opinion (O(P))", "negative opinion (O(N))", "neutral opinion (O(E))", "comment (C)", "request (RE)", "issue (I)", "action item (A.I.)", and "decision (D)".

At S21, the meeting assistance system 1 initializes an abstract (summary) flag. More specifically, the meeting assistance system 1 sets the abstract (summary) flag to "false". The abstract (summary) flag is a flag to indicate whether to switch between the abstract mode and the all-statement mode. In this example, when the abstract (summary) flag is set to "false", the meeting assistance system 1 switches to the all-statement mode to display all statements that have been input. When the abstract (summary) flag is set to "true", the meeting assistance system 1 switches to the abstract mode to display an abstract of statements that have been input, such as key statements extracted from the all statements.

At S22, the meeting assistance system 1 accepts a selection of the abstract instruction key BN1 (FIG. 8). In response to selection of the abstract instruction key BN1, the display mode is switched between the all-statement mode and the abstract mode. More specifically, when the abstract (summary) flag is set to "true", selection of the instruction key switches from the abstract mode to the all-statement mode. When the abstract (summary) flag is set to "false", selection of the instruction key switches from the all-statement mode to the abstract mode.

At S23, the meeting assistance system 1 determines whether the abstract (summary) flag is set to "true". When it is determined that the abstract (summary) flag is set to "true" ("YES" at S23), the operation proceeds to S24. On the other hand, when it is determined that the abstract (summary) flag is not "true", but "false" ("NO" at S23), the operation proceeds to S26.

At S24, the meeting assistance system 1 displays all statements that have been input. More specifically, the meeting assistance system 1 displays a screen illustrated in FIG. 8. That is, in the all-statement mode, the meeting assistance system 1 displays statements of all types, which have been input.

At S25, the meeting assistance system 1 sets the abstract (summary) flag to "false", which indicates that the screen is in the all-statement mode.

At S26, the meeting assistance system 1 displays an abstract of statements that have been input. More specifically, the meeting assistance system 1 displays a screen, for example, as described below.

FIG. 10 illustrates an example screen displayed by the meeting assistance system 1 in the abstract mode, according to an embodiment. Compared to the screen illustrated in FIG. 8, the screen of FIG. 10 displays an abstract "ABS" of the statements that have been input.

The abstract, in this example, is generated by extracting key statements from the statements that have been input during the meeting. Thus, the abstract is a brief summary of statements, or discussions, made during the meeting. The meeting assistance system 1 determines whether each statement is a key statement, based on whether each statement has a statement type that is previously set as important. For example, the abstract may be generated so as to include those statements having any one of the "proposal" "issue" and "action item" types, out of all statements that have been input. The meeting assistance system 1 generates an abstract of statements, by extracting one or more statements each having a predetermined statement type from all input statements. FIG. 10 illustrates an example screen displayed in the abstract mode, in which statements having any one of the "issue" and "action item" types are extracted from all statements that have been input, compared to the screen of FIG. 8 in the all-statement mode. As illustrated in FIG. 10, the meeting assistance system 1 displays the extracted statements having specific types, while not displaying statements having other types. With this screen illustrated in FIG. 10, the meeting participants can easily recognize the action items. Accordingly, the meeting participants are able to review the important points of the meeting. This prevents the meeting participants from missing the issues, action items, or decisions, which are important points made at the meeting, thus improving effectiveness and efficiency of the meeting.

While the specific statement types for display in abstract mode can be set by the user, the specific statement types may be set by a service provider of the meeting assistance system by default.

Referring back to FIG. 9, the meeting assistance system 1 sets the abstract (summary) flag to "true", which indicates that the screen is displayed in the abstract mode.

As described above, S22 to S27 are repeated by the meeting assistance system 1. Through the above-described operation, the meeting assistance system 1 is able to switch between the all-statement mode and the abstract mode, in response to a user instruction. More specifically, in the abstract mode, the meeting assistance system 1 extracts one or more sentences having the specific statement types, and generates a list of the extracted statements for output.

In another example, the meeting assistance system 1 may additionally generate one or more topics based on the statements. The topic is any word, which may express a subject, theme, feature, or issue, that are common to a plurality of sentences belonging to the same group. For example, the meeting assistance system 1 may display one or more topics that are generated as described below.

Figure 11:
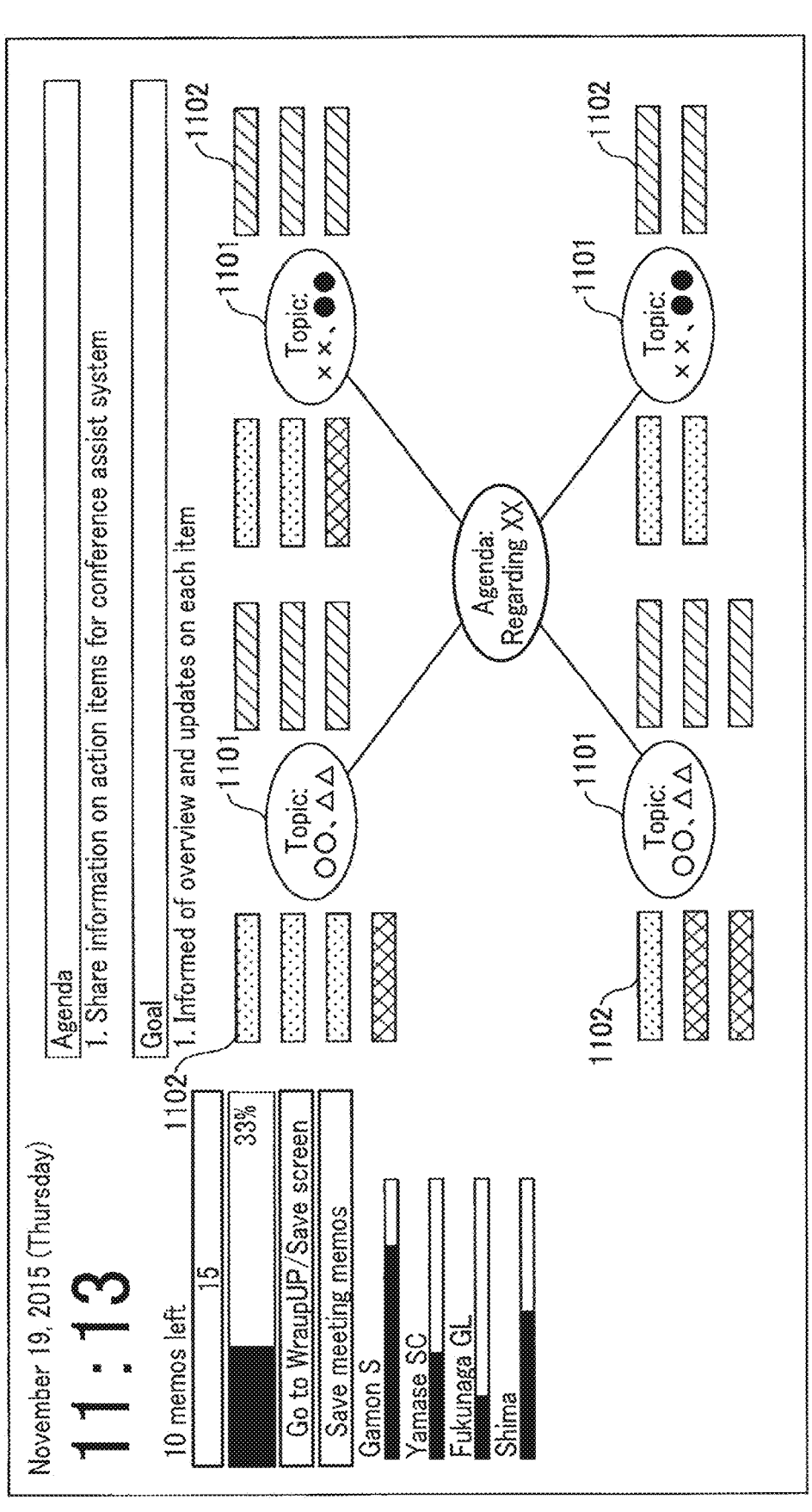
FIG. 11 is an illustration of an example screen with topics of statements, displayed by the meeting assistance system, according to an embodiment.

FIG. 11 illustrates an example screen of one or more topics, displayed by the meeting assistance system 1, according to an embodiment. In this example, the meeting assistance system 1 generates a topic 1101 for a group of statements, and displays the topic 1101 with corresponding group of statements 1102.

The statements made during the meeting are usually grouped into a plurality of topics 1101. Alternatively, the statements made during the same meeting may be grouped into the same topic 1101.

As illustrated in FIG. 11, the statements that have been input are grouped into one or more groups of statements 1102 by topic 1101. The statements 1102 in the group are classified into one or more types according to content of the statement, as described above. In this example illustrated in FIG. 11, among the statements belonging to the same topic, the "positive opinion" statements 1102 are displayed at left, and the "negative opinion" statements 1102 and the "issue" statements 1102 are displayed at right. Since the statements 1102 are displayed at different locations by statement type, the user can instantly grasp the content of discussions.

In case the statement 1102 is made of a long sentence, the meeting assistance system 1 may make that sentence shorter for display. For example, the meeting assistance system 1 may apply sentence compression to the target statement (sentence) to simplify the statement.

More specifically, in one example, the meeting assistance system 1 analyzes the statement using a parser. That is, the parser separates the statement (sentence) being input into a plurality of components. The meeting assistance system 1 assigns an importance level to each of the components. The meeting assistance system 1 deletes one or more components with a low importance level. Through this operation, the meeting assistance system 1 is able to shorten a length of the sentence while keeping a sentence structure.

The importance of each sentence is determined as follows. The noun, proper noun, nominative, and objective are determined to have a higher level of importance.

The expression "such as" "like" "etc.", a component including a particle, adverb, and modifier are determined to have a lower level of importance.

The meeting assistance system 1 deletes a component with less importance, such as a modifier, embedded clause, and subordinate clause, from the sentence to shorten the sentence. The sentence compression is performed using any desired known method, for example, natural language processing.

With the topics being displayed, the users can easily review the content of discussions, for example, at the end of meeting. For example, as described above referring to FIG. 11, through displaying the statements by statement type of "issue", "action item", and "decision" for each topic, the users can easily and effectively check and share a summary of the meeting.

The above-described function of the meeting assistance system 1 is not used only at the end of meeting. In another example, such function may be used after the meeting, for example, when a report, such as meeting memos or notes, is being prepared. The distance between the topics may be generated so as to prevent omission or duplication of topics, using any known method.

The topic 1101 may be generated, for example, as described below.

Figure 12:
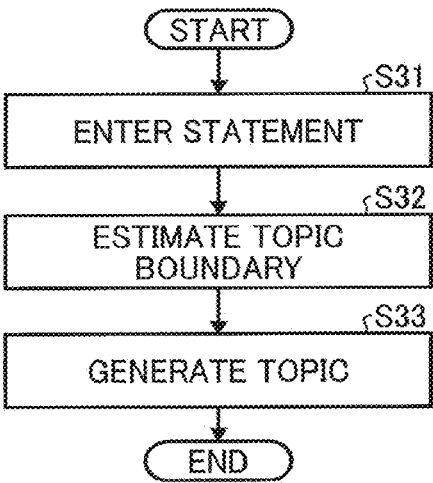
FIG. 12 is a flowchart illustrating operation of generating a topic, performed by the meeting assistance system, according to an embodiment.

FIG. 12 is a flowchart illustrating operation of generating a topic, performed by the meeting assistance system 1, according to an embodiment. Through operation of FIG. 12, the meeting assistance system 1 may display the screen as illustrated in FIG. 11. The operation of FIG. 12 is performed by the CPU 10H1 of the server 10.

At S31, the meeting assistance system 1 inputs one or more statements made during the meeting. For example, if the meeting is carried out using the meeting assistance system 1, all the statements during the meeting have been input.

At S32, the meeting assistance system 1 estimates a topic boundary. To generate a topic for each group of statements, the meeting assistance system 1 firstly classifies the statements into a plurality of groups. The topic boundary is used to classify the statements into the groups. For example, the meeting assistance system 1 sets a topic boundary, such that the statements that are common or highly related in content fall in the same group.

The topic boundary may be estimated using, for example, either one of the following four methods.

The first estimation method sets a topic boundary, when a keyword is detected that reflects the topic shift. Examples of keyword reflecting the topic shift include, but not limited to, "by the way" and "Now". The meeting assistance system 1 previously stores example keywords according to a user operation.

The second estimation method sets a topic boundary, when a word is detected that reflects the initiative change. For example, when the word such as "a while ago" and "in the past" is detected, the meeting assistance system 1 estimates a topic boundary. The meeting assistance system 1 previously stores example words according to a user operation.

The first and second estimation methods are described in, for example, MIYAMURA and TOKUNAGA, "Real-time Topic Segmentation of information seeking chat", Sections 5.2 and 5.3, the contents of which are hereby incorporated by reference herein.

The third estimation method sets a topic boundary, when a sentence indicating the "question" is detected. For example, when the sentence having the type of question is detected, the meeting assistance system 1 sets a topic boundary.

The fourth estimation method sets a topic boundary, using "lexical cohesion". For example, lexical cohesion may be computed using such as Thesaurus. More specifically, in lexical cohesion, lexical chains, which are chains of related words that contribute to the continuity of lexical meaning, are detected. Assuming the lexical chains provide a semantic context for interpreting words or sentences, a start point and an end point of the lexical chains are estimated as a topic boundary. The fourth estimation method is described in, for example, HONDA and OKUMURA, "Text Segmentation based on Lexical Cohesion", Section 5, the contents of which are hereby incorporated by reference herein.

At S33, the meeting assistance system 1 generates a topic. That is, at S33, the meeting assistance system 1 generates a topic using a topic boundary that is estimated at S32. S33 is repeatedly performed for each group that is generated based on the topic boundary that is estimated.

The topic may be generated using any desired method, such as any one of the following three methods.

According to the first generating method, the meeting assistance system 1 extracts, from sentences that are grouped by topic boundary, an unknown word as a topic. The unknown word may be a proper noun or any word that is not registered in a dictionary.

According to the second generating method, the meeting assistance system 1 extracts, from sentences that are grouped by topic boundary, nouns, verbs, and adjectives. The meeting assistance system 1 then changes the extracted nouns, verbs, and adjectives to a base form. The meeting assistance system 1 sets any word that is most frequently used, to a topic. For example, the meeting assistance system 1 may display one or more topics that are generated as described below.

According to the third generating method, the meeting assistance system 1 may extract one or more keywords that express a group of sentences within a specific topic boundary. For example, such keywords may be determined using term frequency-inverse document frequency (TF-IDF) method.

The meeting assistance system 1 generates a list of one or more sentences having a predetermined type for output. In this example, it is assumed that the meeting has been carried out using the meeting assistance system 1 such that all sentences during the meeting have been input. Further, the meeting assistance system 1 is programmed to perform the operation described below, when a sentence is detected that has one of the specific types "issue", "action item", and "decision".

Figure 13:
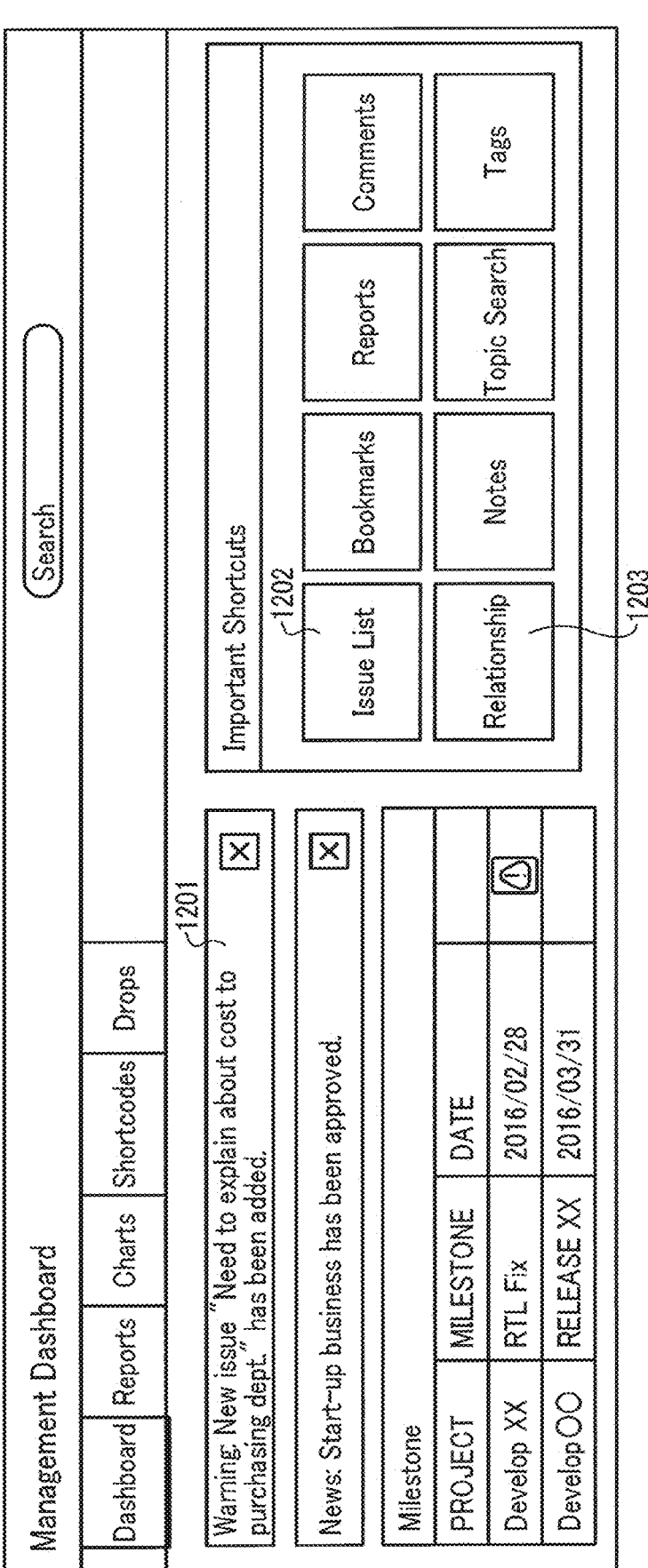
FIG. 13 is an illustration of an example screen with an alert, displayed by the meeting assistance system, according to an embodiment.

FIG. 13 is an illustration of an example screen with an alert, displayed by the meeting assistance system 1, according to an embodiment. For the descriptive purposes, it is assumed that the meeting has been assisted with the meeting assistance system 1, and the statement having the "issue" type has been input. That is, the sentence having the "issue" type has been input. When the meeting ends, the meeting assistance system 1 outputs a screen as illustrated in FIG. 13. In case the statement is input in the form of an email message, the meeting assistance system 1 displays the screen of FIG. 13 in response to receiving such email message.

As illustrated in FIG. 13, the meeting assistance system 1 displays an alert 1201. In this example, the alert 1201 displays the statement having the "issue" type. With the alert 1201, a user becomes aware of addition of the statement with a tag of the "issue" type that is the specific type.

More specifically, the meeting assistance system 1 extracts, from the statements that have been input during the meeting, one or more statements each having the "issue" statement type for display as the alert 1201. The statement type for display as the alert may be previously set by default or according to the user preference.

The alert 1201 may be output as a link to meeting memos or notes (report) including the displayed sentence. When selected by a user, the alert 1201 causes the notes to be displayed. When the meeting memos or notes are displayed according to a user selection of the alert 1201, the user is able to know a content or flow of discussions that leads to the "issue" statement being displayed. In case the user viewing the screen of FIG. 13 is a manager, the manager is able to effectively know the issue that may newly arise, before the manager receives such as a periodic report. Not only that the manager can be notified of such issue, the manager is able to follow up with a team member about this issue more quickly.

Referring to FIG. 13, in response to selection of a "issue list" key 1202, the meeting assistance system 1 outputs a list of statements having the "issue", "action item", and "decision" types, for example, as described below.

FIG. 14 is an illustration of a screen that lists statements of specific types, displayed by the meeting assistance system 1, according to an embodiment. In this example, the meeting assistance system 1 displays a list of statements corresponding to the "issue", "action item", and "decision" ty pes, which are extracted from the statements that have been input. The screen of FIG. 14 is displayed by the meeting assistance system 1, in response to selection of the "issue list" key 1202 in FIG. 13.

As illustrated in FIG. 14, the meeting assistance system 1 displays a list of statements corresponding to the "issue", "action item", and "decision" types, which are extracted from the statements that have been input. The types of the statements that are specified, such as the "issue", "action item", and "decision" in this example, are previously set at the meeting assistance system 1.

With a list of statements of specific types on the list 1301, the manager is able to manage the issues related to his or her team more effectively.

The list 1301 may be displayed with a link 1302 to the meeting memos or notes (report). In response to selection of the link 1302, the meeting assistance system 1 displays such as meeting memos or notes that summarize a content or a flow of discussions that may lead to the statement ("issue", "action item", and "decision") listed on the list 1301. The user can then grasp a background of the discussions that lead to the statement having at least one of the specific types.

The statements listed on the list 1301 may be limited to those sentences related to a specific group of users, such as a specific department that the user viewing the screen belongs. For example, in case the meeting memos include any statement made by a meeting participant who belongs to the specific department, the meeting assistance system 1 determines that any statement included in the notes is related to the specific department, that is, to the user viewing the screen. In case the statement is input as an email message, if a sender or a receiver of the email belongs to the specific department, the meeting assistance system 1 determines that any statement in the email message is related to the specific department, that is, to the user viewing the screen. In this example, in transmitting the email message, the user sets the meeting assistance system 1 as one of destinations of such email message. The meeting assistance system 1 determines that statements in the email message relate to the specific department.

As described below, the meeting assistance system 1 may further display activities such as meetings and emails in chronological order.

Figure 15:
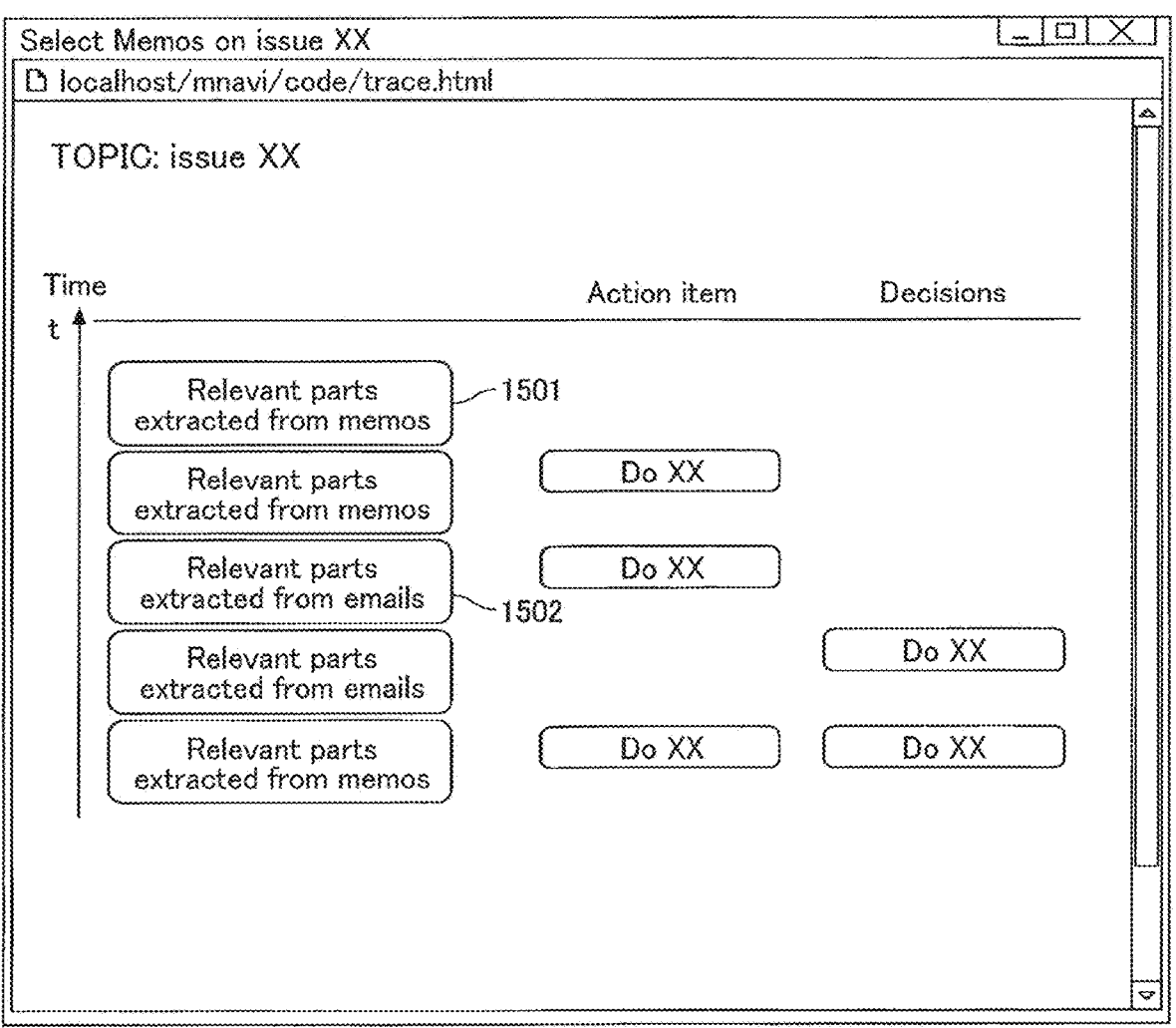
FIG. 15 is an illustration of an example screen with the statements of specific types displayed along a timeline.

FIG. 15 is an illustration of an example screen of a timeline, displayed by the meeting assistance system 1, according to an embodiment. The screen of FIG. 15 is displayed in response to selection of a "view" key 1303 in FIG. 14. For example, the user presses the "view" key 1303 to view a timeline of activities related to the listed statement.

As the "view" key 1303 is pressed, the meeting assistance system 1 extracts one or more statements related to the "issue" statement listed on the list 1301, and displays the extracted "issue" statements in chronological order. The statements to be extracted may be those statements belonging to the same topic that the listed statement belongs. As illustrated in FIG. 15, the "action item" statements and "decision" statements, relating to the extracted "issue" statements, may be displayed in association. The specific types subject to display are previously set at the meeting assistance system 1.

The "issue" statement 1501, extracted from the meeting memos or notes, is displayed at a specific coordinate along the "time" axis, which is determined by a date and time of the meeting memos or notes from which the "issue" statement is exacted. Alternatively, if the date and time when the statement is input to the meeting assistance system 1 is kept stored, the meeting assistance system 1 may use such information to determine the coordinate along the time axis. The statement 1502, extracted from the email message, is displayed at a specific coordinate along the "time" axis, which is determined by a transmission date and time in a header of SMTP email message, for example.

As the statements 1501 and 1502 are displayed in chronological order along the "time" axis, in association with the "action item" and "decision" statements, the user can easily grasp how the decision has been made. In one example, this helps a new manager, who is just transferred from another department, to quickly learn the issues that the department has. In another example, the manager can easily review or analyze the issues.

The meeting assistance system 1 may additionally display a diagram visualizing communications among a plurality of users, as described below. In the following, the diagram visualizing the communications is referred to as the "communication diagram". Further, the plurality of users for display in the communication diagram may be the meeting participants of the meeting subject for evaluation (the example case illustrated in FIG. 16), or the team members of a team for evaluation. The users to be displayed on the communication diagram may be selected according to the user preference.

Figure 16:
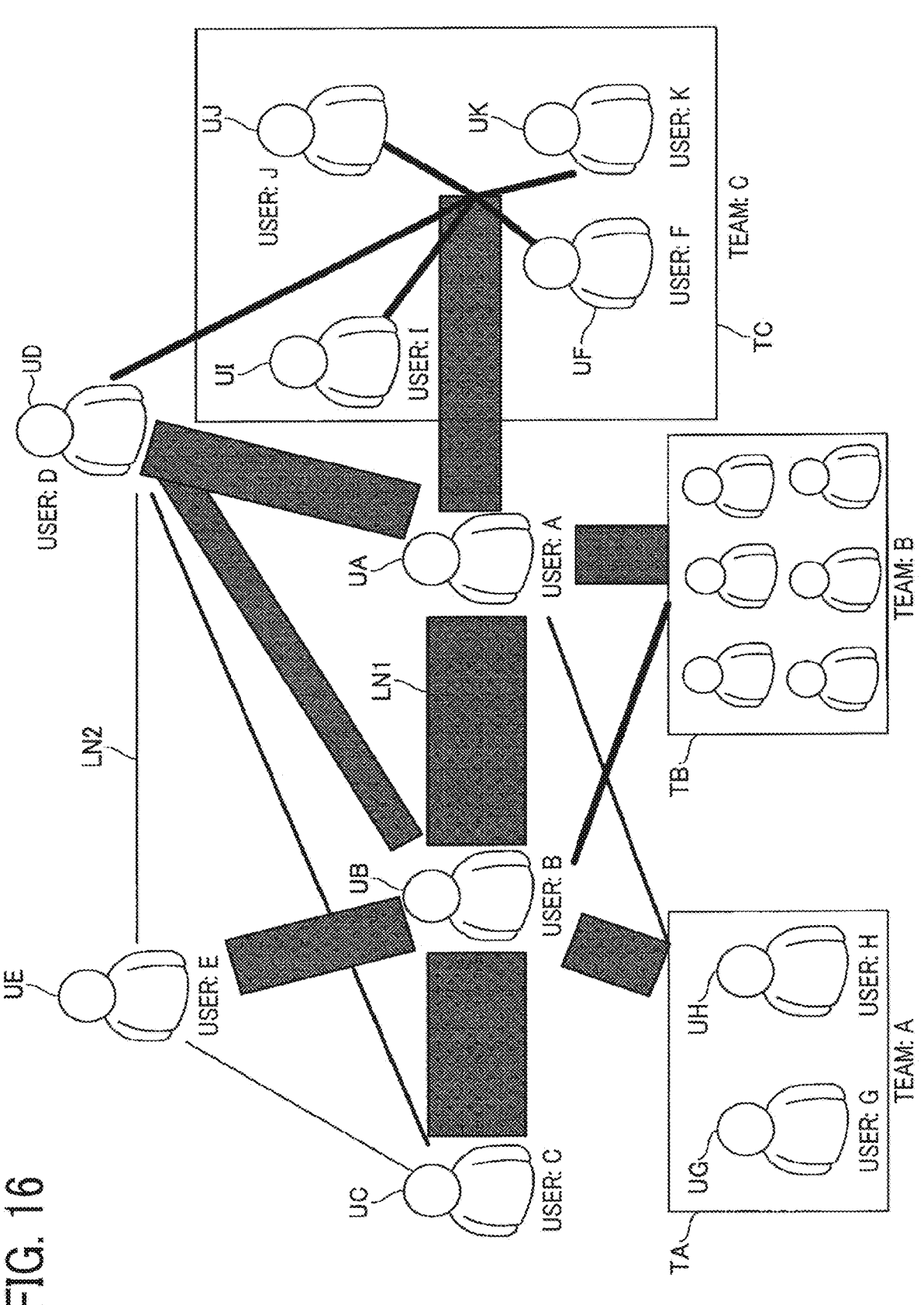
FIG. 16 is an illustration of an example screen with a communication diagram, displayed by the meeting assistance system, according to an embodiment.

FIG. 16 is an example communication diagram displayed by the meeting assistance system 1, according to an embodiment. The thickness of a line connecting the users expresses a number of communications that have been made between the users for a predetermined time period. The communication diagram of FIG. 16 is displayed by the meeting assistance system 1, in response to selection of a "relationship" key 1203 in FIG. 13.

The meeting assistance system 1 extracts, from such as meeting memos or notes, the meeting participants and the meeting length. Based on information regarding the meeting participants and the meeting length, the meeting assistance system 1 computes a strength of the relationship between the users ("relationship strength").

For example, the relationship strength between the users may be calculated based on a sum of meeting lengths for the meetings that both of the users participate in. In calculating the relationship strength, the meeting assistance system 1 may weigh a meeting length to be added, depending on a number of meeting participants for each meeting. In case there is a small number of meeting participants, such as in the case where only two persons attend, the strength of relationship tends to increase. Based on this assumption, the meeting length for the meeting with a smaller number of participants is multiplied with a weighing factor. Accordingly, the relationship strength between the users, who are most likely to attend at the same meeting with a smaller number of participants, increases.

In case of communication via email messages, the relationship strength between the users is calculated based on a number of exchanges of email messages between those users. Further, the relationship strength may be weighted based on whether the user is included in the "TO" field or "CC" field of the email.

The meeting assistance system 1 changes a thickness of the line connecting the users, according to the relationship strength computed for these users. In this example illustrated in FIG. 16, the user A and the user B having a strong relationship strength, are connected via a thick line LN1.

The user D and the user E having a relationship strength less than that of between the user A and the user B, are connected via a line LN2 thinner than the line LN1. The meeting assistance system 1 changes a thickness of a line connecting the users, based on the relationship strength between the users, which may change over time.

With this communication diagram illustrated in FIG. 16, a number of communications between the users, which indicates the relationship strength, can be visualized. For example, the communication diagram visualizes a relationship between the users at work. With this communication diagram, any user is able to instantly know a user who plays an important role in organization, or a user who communicates with other in different department.

As illustrated in FIG. 16, the meeting assistance system 1 may display an indication (TA or TB) of a team A or B, to indicate who belongs to which team. Further, the user and the team may be connected via a line according to a relationship strength between the user and the team.

Figure 17:
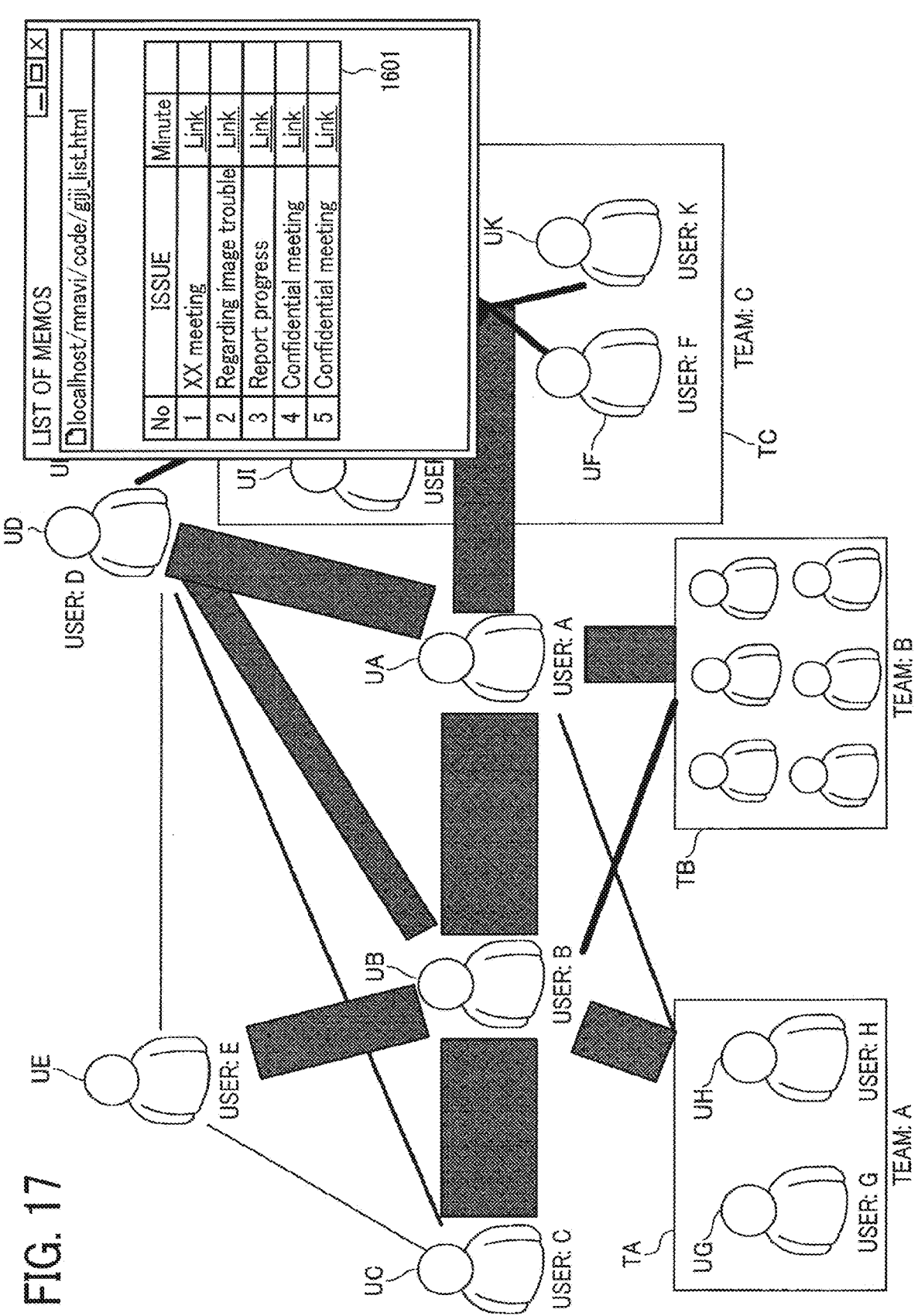
FIG. 17 is an illustration of an example screen with a log of communications, displayed by the meeting assistance system, according to an embodiment.

In response to selection of one of the lines expressing the relationship strength, the meeting assistance system 1 may display a screen such as a pop-up screen, for example, as illustrated in FIG. 17.

FIG. 17 is an illustration of an example screen that lists a log of communications between the users, displayed by the meeting assistance system 1, according to an embodiment. The screen of FIG. 17 is displayed when one of the lines (such as the line LN1 or the line LN2) in FIG. 16 is selected by the user. The meeting assistance system 1 displays a log 1601 of communications between the selected users. The log 1601 lists, for example, meeting memos of the meetings that both of the users have attended. In response to selection of a link to a selected meeting memos on the log 1601, the meeting assistance system 1 further displays a detail of the selected memos, in a substantially similar manner as described above in the case when the link 1302 of FIG. 14 is selected.

With the log 1601, the user is able to easily access memos that describe a detailed content of each communication between the selected users. More specifically, with the log 1601, the user is able to access information to see a content of report made by the selected user, or a decision made by the selected user. The selected user may be, for example, a user who has a strong relationship with other department.

The meeting assistance system 1 may perform functions different than the above-described functions of FIG. 3.

Figure 18:
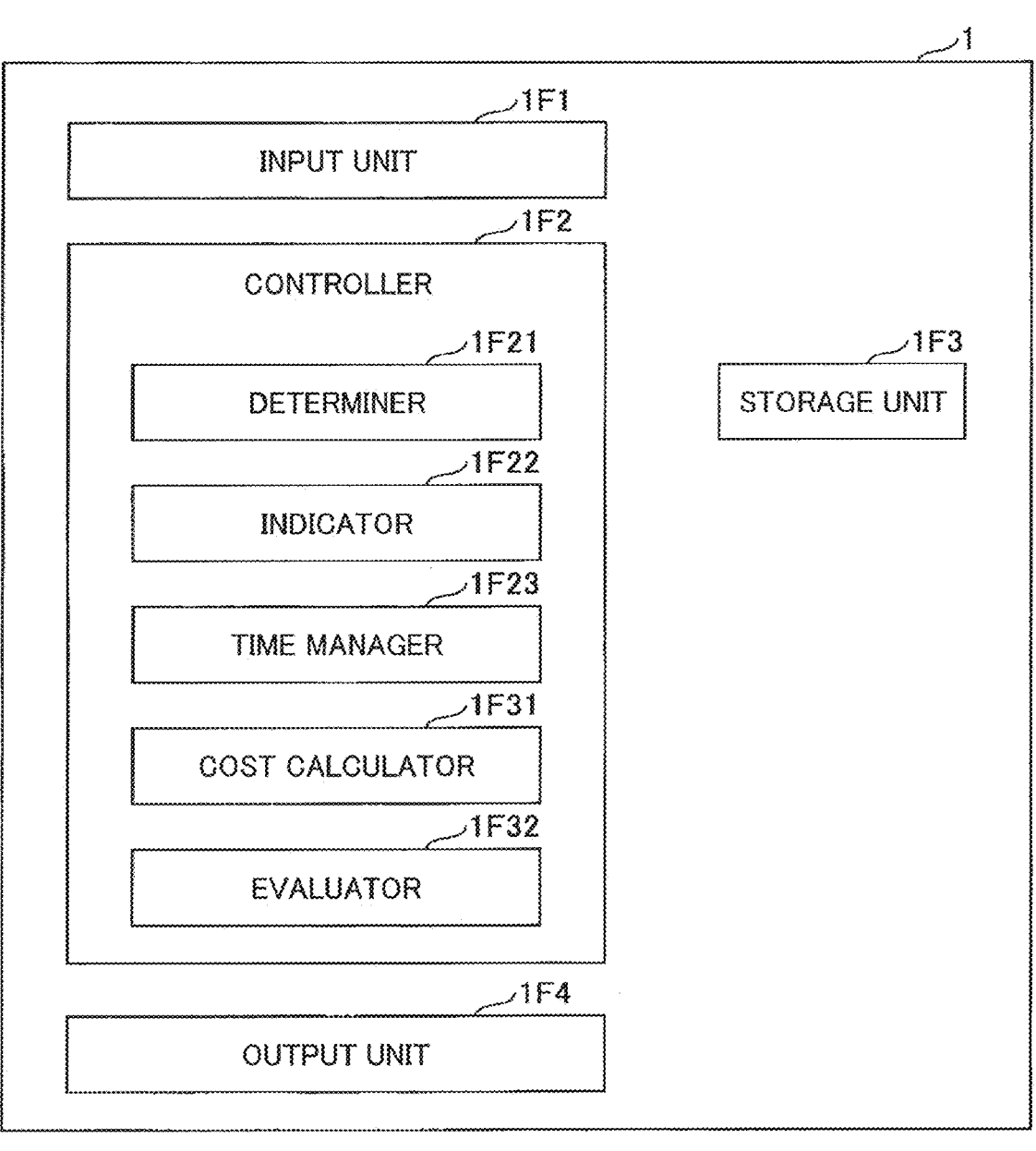
FIG. 18 is a schematic block diagram illustrating a functional configuration of the meeting assistance system of FIG. 1, according to an embodiment.

FIG. 18 is a schematic block diagram illustrating a functional configuration of the meeting assistance system 1 according to another example. The function configuration of FIG. 18 is substantially similar to that of FIG. 3, except for addition of a cost calculator 1F31 and an evaluator 1F32.

The cost calculator 1F31 calculates a cost of the meeting, based on labor cost of meeting participants.

The evaluator 1F32 evaluates the meeting, in terms of a length of the meeting, a number of statements, types of statements, and analysis on type of statements.

The cost calculation by the cost calculator 1F31, or the evaluation by the evaluator 1F32, may be performed, for example, in response to selection of the key 309 on the screen of FIG. 4 or the alert 402 of the screen of FIG. 6. Such key is selected by the user when the meeting participants want to review the discussions, for example, to end the meeting. With selection of one of the key 309 or 402, the meeting assistance system 1 displays a screen of FIG. 19.

Figure 19:
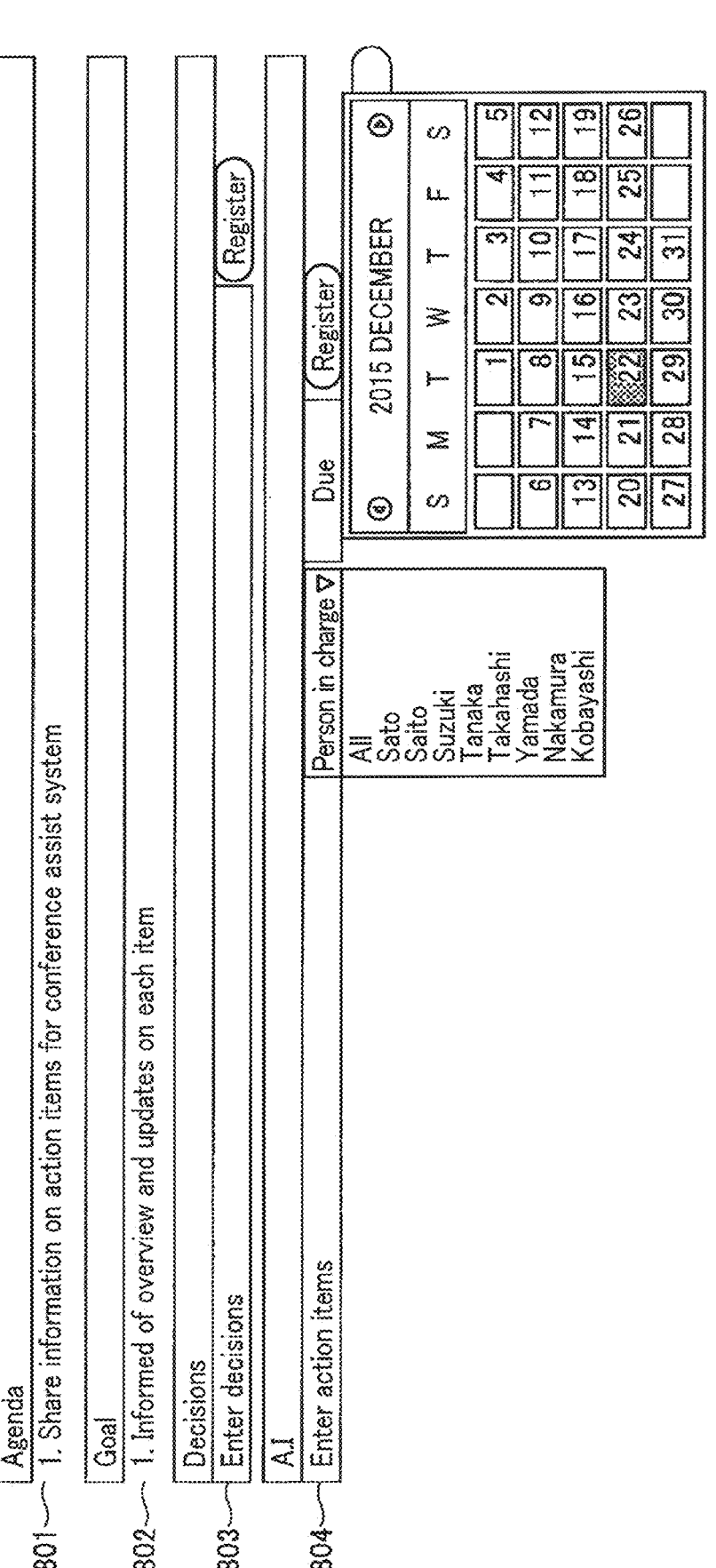
FIG. 19 is an illustration of an example screen with a meeting summary, displayed by the meeting assistance system of FIG. 18, according to an embodiment.

FIG. 19 illustrates an example screen of a meeting summary, displayed by the meeting assistance system 1, according to the embodiment. The meeting assistance system 1 displays, in an agenda field 801, the agenda that is entered in the agenda text box 501 of the screen of FIG. 5. The agenda may be set, for example, at the time the notification about the meeting is sent or at the time the meeting starts. The meeting assistance system 1 further displays, in a goal field 802, the goal that is entered in the goal text box 502 of the screen of FIG. 5. The goal may be set, for example, at the time the notification about the meeting is sent or at the time the meeting starts.

The screen of FIG. 19 further includes a decision text box 803 for entering a decision, which corresponds to the content displayed in the agenda field 801 and the goal field 802. The screen of FIG. 19 further includes an action item text box 804 for entering an action item decided at the meeting, which corresponds to the content displayed in the agenda field 801 and the goal field 802. For each action item being set, a due date and/or a person in charge may be entered. The action item text box 804 may automatically display the statement having the "action item" type, which is determined by the meeting assistance system 1, to assist the user in entering the action item.

Figure 20:
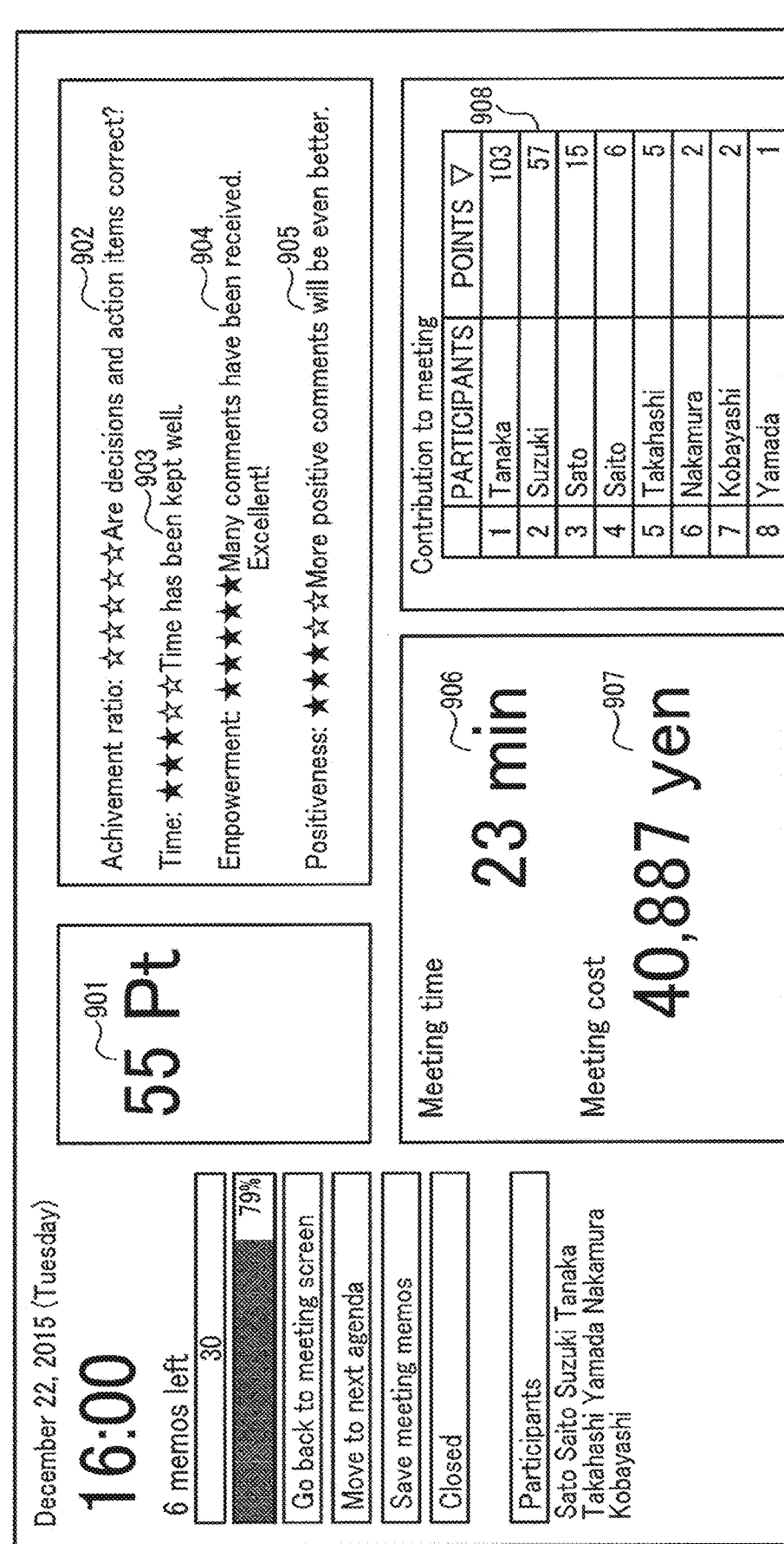
FIG. 20 is an illustration of an example screen with an evaluation result, displayed by the meeting assistance system of FIG. 18, according to an embodiment.

The meeting assistance system 1 may display an evaluation screen of FIG. 20, which includes information regarding the cost calculated with the cost calculator 1F31 or the evaluation made by the evaluator 1F32.

FIG. 20 illustrates an example screen of an evaluation result, displayed by the meeting assistance system 1, according to the embodiment. For example, the meeting assistance system 1 displays the meeting cost and the evaluation result, in terms of a score or a cost.

The total meeting points 901 is an overall evaluation of the meeting, which is obtained as a sum of an achievement ratio evaluation 902, a meeting time evaluation 903, an empowerment evaluation 904, and a positiveness evaluation 905.

The achievement ratio evaluation 902 is an evaluation result, which indicates whether a decision is entered for each goal of each agenda that has been entered in the agenda text box 501 (FIG. 5). For example, if there are four agendas entered in the agenda text boxes 501 (FIG. 5), and only two decisions are entered, the meeting assistance system 1 sets the achievement ratio evaluation 902 to half of the full score.

The meeting time evaluation 903 is an evaluation result, which is determined based on a comparison between the scheduled time (scheduled length of meeting) and the meeting time (an actual length of meeting). The scheduled time may be obtained from the text box 503 (FIG. 5) or the notification about the meeting. For example, if the meeting time is less than the scheduled time, the meeting time evaluation 903 has a higher point. If the meeting time is greater than the scheduled time, the meeting time evaluation 903 has a lower point.

The empowerment evaluation 904 is an evaluation result, which is determined based on a number of statements made during the meeting or a number of statements made per unit time. For example, when the number of statements during the meeting or per unit time becomes higher, the empowerment evaluation 904 has a higher point. When the number of statements during the meeting or per unit time becomes less, the empowerment evaluation 904 has a lower point. With the lower point of the empowerment evaluation 904, the meeting itself may not be necessary, or the meeting participants may be irrelevant to a content of the meeting. The meeting assistance system 1 outputs the evaluation result to the user (such as a meeting organizer), to advise the user to consider how the meeting should be operated.

The positiveness evaluation 905 is an evaluation result, which is determined based on statement types, or occurrence ratio of the statements having a specific statement type. For example, when an occurrence ratio of the statements having the proposal is higher, the evaluation point of the positiveness evaluation 905 increases. When the occurrence ratio of the statements having the proposal is lower, the evaluation point of the positiveness evaluation 905 decreases. In the meeting with the lower points of positiveness evaluation 905, the number of opinions and comments tends to increase, and the decision can be hardly made. In such case, the meeting assistance system 1 advises the meeting participants or the user to give a constructive comment to achieve the goal of the meeting.

The meeting assistance system 1 performs evaluation with the evaluator 1F32 (FIG. 18) to generate the above-described evaluation result. The output unit 1F4 (FIG. 18) then outputs the evaluation result to the meeting participants or the user through a screen. Accordingly, the meeting assistance system 1 is able to give objective feedback to the meeting participants. More specifically, the meeting assistance system 1 is able to address the problems that may cause ineffective meeting. For example, the meeting assistance system 1 is able to let the meeting participants know a length of meeting compared to the scheduled length of meeting. With the evaluation result, the meeting assistance system 1 encourages the meeting participants or any user (such as a manager) to review the meeting and identify areas for improvement.

The evaluation result, or any other information regarding the meeting such as a number of statements or statement types, may be displayed at the meeting assistance system 1 any time during the meeting. For example, referring to FIG. 4, information indicating a number of statements made by each meeting participant may be displayed as bars 310. The bar 310 corresponding to each meeting participant reflects a number of statements that has been made by the participant in real time. With this information, the meeting assistance system 1 or any meeting organizer is able to request the meeting participant with less number of statements to speak up more.

In displaying information regarding the statements, the meeting assistance system 1 may weigh the "issue" and "proposal" statements more heavily than the statements of other types. This encourages the meeting participants to think about issues that may arise in the future, or to come up with proposals to achieve the goal. Accordingly, the meeting assistance system 1 facilitates effective discussions among the meeting participants.

The meeting assistance system 1 may further display, on the screen, information regarding a meeting cost, as illustrated in FIG. 20. For example, the cost calculator 1F31 (FIG. 18) calculates the meeting cost, based on a meeting time 906 and employment cost of each meeting participant (such as annual salary). The calculated meeting cost 906 is displayed, for example, on the screen of FIG. 20.

In calculating the meeting cost, the meeting assistance system 1 is input with an employment cost per unit time for each meeting participant, such as annual salary for each meeting participant. As described above, the employment cost may be calculated based on actual annual salary for each meeting participant. In alternative to inputting employment cost for individual employee, the average employment cost may be input. Alternatively, the employment costs, which differ in positions in company, may be input, for example, with information regarding a company position of each meeting participant.

The meeting assistance system 1 counts a length of meeting, from the time when the meeting starts to the time when the meeting ends. The meeting assistance system 1 displays a counted time as the meeting time 906. The meeting assistance system 1 multiplies the per-unit employment cost for each meeting participant, with the calculated meeting time 906, to obtain a meeting cost for each meeting participant. Next, the meeting assistance system 1 calculates a sum of the meeting costs of the meeting participants, and displays the sum as the meeting cost 907, as illustrated in FIG. 20.

The meeting assistance system 1 may further display an evaluation result for each meeting participant. For example, referring to FIG. 20, a contribution result 908 displays the degree of contribution to the meeting made by each meeting participant.

The contribution result 908 is an evaluation result of each meeting participant, which is determined by the determiner 1F21 (FIG. 18) based on statement types and a number of statements of the meeting participant. In this example, the speaker determiner 1F24 associates each statement with a speaker who made that statement.

The contribution result 908 may be calculated by the meeting assistance system 1, for example, as described below. The statement types are each previously assigned with evaluation points. For example, the "neutral opinion" is assigned with "1 point", and the "issue" statement and the "proposal" statement are each assigned with "5 points". Depending on the purpose of the meeting, specific statement types to be weighed heavily are previously determined. For example, in the case of problem-solving meeting, the meeting assistance system 1 may be set such that the "issue" statement and the "proposal" statement are weighed more heavily than statements of other types, as these are more constructive comments. Accordingly, the meeting assistance system 1 facilitates effective discussions among the meeting participants, to solve the problem.

The meeting assistance system 1 evaluates, for each meeting participant, based on a product of the evaluation result by the determiner 1F21 (FIG. 18) and the number of statements. The calculated product of the evaluation result and the number of statements, is the points that the meeting participant has acquired as illustrated in FIG. 20. This point reflects the degree of contribution to the meeting by each meeting participant. Based on this feedback on the degree of contribution by each meeting participant, the user such as the meeting organizer or manager is able to determine who should attend the meeting from next time. Accordingly, the meeting assistance system 1 facilitates effective discussions among the meeting participants. For example, if the number of meeting participants can be reduced based on the degree of contribution, the meeting cost can be reduced.

Any one of the screens displayed by the meeting assistance system 1 may be displayed at any display, such as a display at any terminal 11 connected to the network 12 in realtime. If the screen is displayed at each terminal 11, even without preparing a large-size display (or projector), the meeting participants can share information with one another.

Any information such as the statements may be edited at any terminal 11. For example, the server 10 transmits a content to be displayed on a screen, in a hyper text markup language (HTML) file, to each terminal 11. As the new statement is input, data indicating the new statement is transmitted to the server 10. The server 10 then transmits anew HTMP file that reflects the newly added statement to each terminal 11.

Any statement to be displayed on the screen may be translated as needed. For example, as the new statement is input, data indicating the new statement is transmitted to the server 10. The server 10 translates the newly input statement, and generates anew HTMP file that reflects the newly added statement both in original language and translated language. The server 10 then transmits the HTMP file having the newly added statement in both languages to each terminal 11. In this way, the user at each terminal 11 is able to choose a language to be displayed, thus suppressing miscommunication among the users speaking in different languages.

Further, each terminal 11 may perform user authentication. For example, the terminal 11 may request the user to enter a user name on an input text box on the screen. In another example, the user authentication may be performed using an IC card or RFID. As described above referring to FIG. 4 for the case of using the function keys to identify each meeting participant, the user authentication result may be used to identify the user at each terminal 11. In this way, the user at a specific terminal 11 and the statement made by the user at that terminal 11 are associated. As described above referring to FIG. 4, the statement may be displayed with information identifying the speaker of such statement, either before or after the statement. Alternatively, the statements may be displayed in different appearances, depending on the speakers, such as in different colors with one color being assigned to each speaker.

Moreover, the meeting assistance system 1 may allow any meeting participant to enter a subjective evaluation to any statement, and evaluates the meeting (or statement) based on the subjective evaluation. The subjective evaluation may be input as follows.

FIG. 21 illustrates an example screen for inputting a subjective evaluation, displayed by the meeting assistance system 1, according to the embodiment. Compared to the screen of FIG. 6, the screen of FIG. 21 additionally includes a subjective evaluation key 1001 for each statement being displayed.

As illustrated in FIG. 21, the subjective evaluation key 1001 is displayed for each statement. When the meeting participant agrees with the statement made by other, the meeting participant selects the subjective evaluation key 1001 being displayed for that statement. The subjective evaluation key 1001 may be selected by a user who is responsible for entering data, or directly by each user who agrees with that statement. Alternatively, the subjective evaluation key 1001 may be caused to be selected, when the meeting participant does not agree (opposes) the statement. The meeting assistance system 1 may evaluate each statement, based on the subjective evaluations of the meeting participants, to generate a subjective evaluation result. The meeting assistance system 1 may further display the subjective evaluation result to the meeting participants, to further encourage comments in line with the highly evaluated comment, to achieve the goal of the meeting.

The meeting assistance system 1 may further change the appearance of the statement, based on the selection of the subjective evaluation key 1001. For example, in the screen of FIG. 21, the "proposal" statement 1002 that the subjective evaluation key 1001 is selected is displayed in larger font.

More specifically, the font of the statement 1002 is made larger than that of the other statement. With the change in appearance, the meeting participants can instantly know that the statement 1002 has been supported by other meeting participants. Using user information regarding the meeting participants, the meeting assistance system 1 may display, for each or specific statement, who agrees on that statement or who disagrees on that statement.

For example, using information indicating whether to agree or not agree the statement, the meeting assistance system 1 may change appearance of that statement by changing a description of cascading style sheets (CSS) with Javascript (Registered Trademark).

In displaying a meeting summary, the meeting assistance system 1 may display the statement that is determined to be important based on the subjective evaluation, in addition to information regarding a statement type. This further helps the meeting participants or any user to understand the content and flow of discussions leading to the decision. Accordingly, the meeting assistance system 1 is able to generate, or help to generate, the meeting memos that are more effective in terms of reviewing the meeting or sharing information.

Further, in this embodiment, the evaluator 1F32 (FIG. 18) may evaluate the meeting, based on a length of meeting. For example, the evaluator 1F32 evaluates the meeting as described below referring to FIG. 22.

FIG. 22 is a flowchart illustrating operation of evaluating the meeting based on the length of meeting, performed by the meeting assistance system 1, according to the embodiment.

At S131, the meeting assistance system 1 accepts selection of an evaluation key. In response to selection of the evaluation key "Evaluate this meeting" in FIG. 10, the meeting assistance system 1 starts operation of evaluating. In this example, it is assumed that the length of meeting ("meeting time") is a duration of a time from the time when the meeting starts to the time when the meeting ends. Further, the scheduled length of time ("scheduled time") is previously input to the meeting assistance system 1, at least before selection of the evaluation key.

At S132, the meeting assistance system 1 determines whether the meeting time goes over the scheduled time by 10% or more. When the meeting assistance system 1 determines that the meeting time goes over the scheduled time by 10% or more ("YES" at S132), the operation proceeds to S133. When the meeting assistance system 1 determines that the meeting time does not go over the scheduled time by 10% or more ("NO" at S132), the operation proceeds to S134.

At S133, the meeting assistance system 1 sets the evaluation point to "0".

At S134, the meeting assistance system 1 determines whether the meeting time goes over the scheduled time by less than 10%. When the meeting assistance system 1 determines that the meeting time goes over the scheduled time by less than 10% ("YES" at S134), the operation proceeds to S135. When the meeting assistance system 1 determines that the meeting time does not go over the scheduled time by less than 10% ("NO" at S134), the operation proceeds to S136.

At S135, the meeting assistance system 1 sets the evaluation point to "5".

At S136, the meeting assistance system 1 determines whether the meeting time goes over the scheduled time by less than 5%. When the meeting assistance system 1 determines that the meeting time goes over the scheduled time by less than 5% ("YES" at S136), the operation proceeds to S137. When the meeting assistance system 1 determines that the meeting time does not go over the scheduled time by less than 5% ("NO" at S136), the operation proceeds to S138.

At S137, the meeting assistance system 1 sets the evaluation point to "10".

At S138, the meeting assistance system 1 determines whether the meeting time is less than the scheduled time by 10% or more. When the meeting assistance system 1 determines that the meeting time is less than the scheduled time by 10% or more ("YES" at S138), the operation proceeds to S139. When the meeting assistance system 1 determines that the meeting time is not less than the scheduled time by 10% or more ("NO" at S138), the operation proceeds to S140.

At S139, the meeting assistance system 1 sets the evaluation point to "25".

At S140, the meeting assistance system 1 determines whether the meeting time is less than the scheduled time by 5% or more. When the meeting assistance system 1 determines that the meeting time is less than the scheduled time by 5% or more ("YES" at S140), the operation proceeds to S141. When the meeting assistance system 1 determines that the meeting time is not less than the scheduled time by 5% or more ("NO" at S140), the operation proceeds to S142.

At S141, the meeting assistance system 1 sets the evaluation point to "20".

At S142, the meeting assistance system 1 sets the evaluation point to "15".

As described above, the meeting assistance system 1 sets a higher evaluation point to the meeting, which takes less time than the scheduled time. The meeting assistance system 1 sets a lower evaluation point to the meeting, which takes a time longer than the scheduled time. The value of evaluation point or determination on evaluation point is not limited to the above-described case, such that it may be changed according to user preferences, for example. Through the operation of FIG. 22, the evaluation result is displayed as illustrated in FIG. 20.

As illustrated in FIG. 20, the meeting assistance system 1 may display the evaluation result using "star" marks, with a number of black stars corresponding to the evaluation points. The meeting assistance system 1 may further display a comment to advise the meeting participants, based on the evaluation points. The advice may help to improve the user's participation at the meeting. The meeting assistance system 1 may further display the evaluation result based on the meeting time, in addition to the evaluation results on other items. In this example illustrated in FIG. 20, the length of meeting (meeting time 906) and the meeting cost 907 are displayed. With display of the evaluation result based on the meeting time, the meeting assistance system 1 encourages the meeting participants to become more aware of the meeting time, to finish up the meeting within the scheduled time. Accordingly, the meeting assistance system 1 is able to improve effectiveness of discussion in the meeting.

Figure 23:
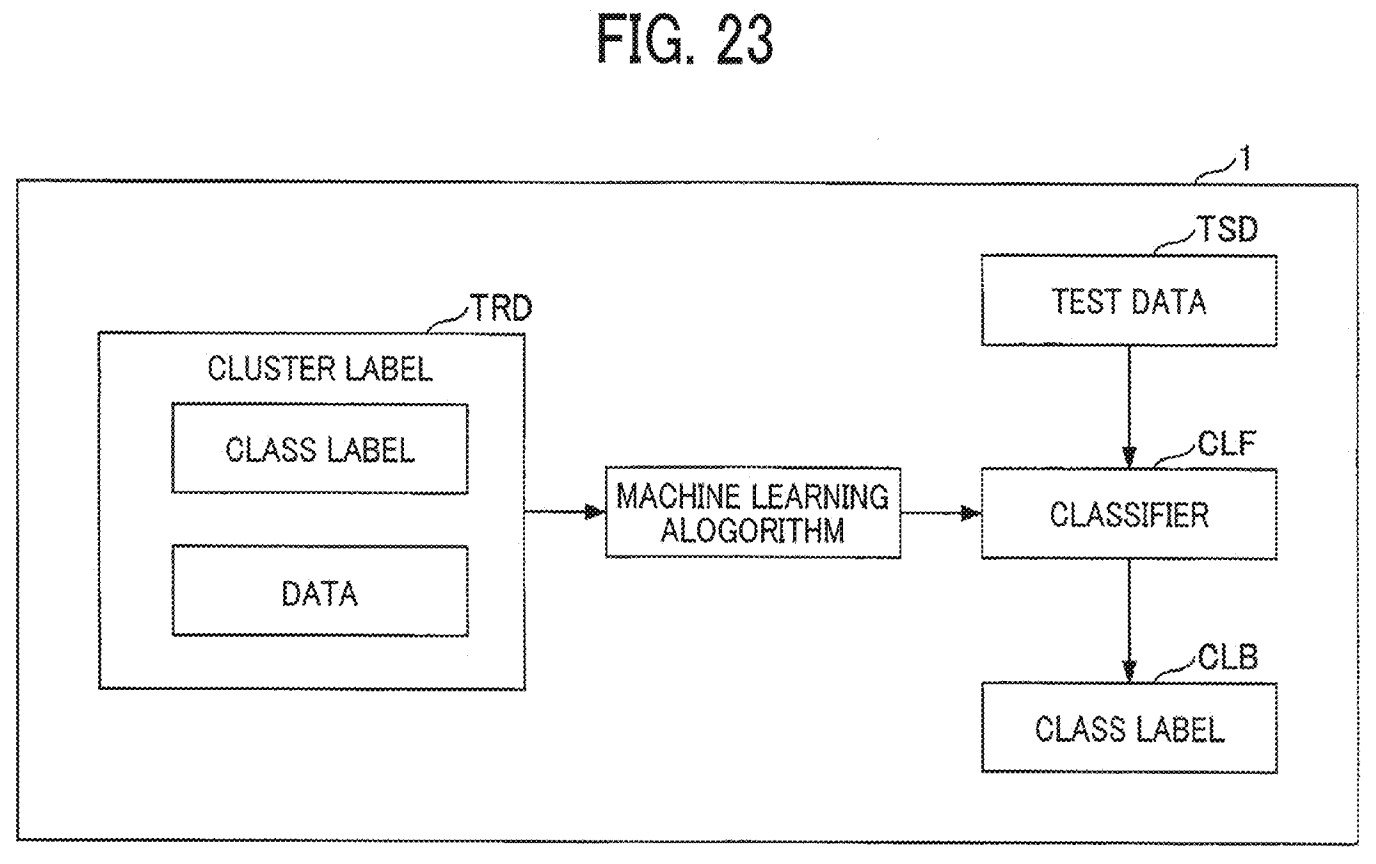

Now, referring to FIG. 23, operation of determining a statement type is described according to another example. The determiner 1F21 in this example performs a technique different from the above-described pattern matching to determine a statement type.

According to this example, the meeting assistance system 1 uses tagged corpus, as training data. The meeting assistance system 1 trains a natural language processing classifier, using supervised learning, which is one example of machine learning. In the following, it is assumed that, tags, that is, the statement types include "proposal (R)", "question (Q)", "answer (A)", "positive opinion (O(P))", "negative opinion (O(N))", "neutral opinion (O(E))", "comment (C)", "request (RE)", "issue (I)", "action item (A.I.)", and "decision (D)".

Examples of machine learning include, but not limited to, support vector machine (SVM), Naive Bayes classifier, decision tree learning, and conditional random field (CRF). Preferably, the SVM may be used as machine learning, which can constantly analyze to output an analysis result in realtime.

The classifier CLF determines a statement type, according to features of the statement. More specifically, as features, Bag of Words (BoW) of the statement, a Part of Speech (POS) of the statement such as auxiliary verb, adverb, adjective, and noun, and a speaker of the statement may be used. For example, the adjective may have positive expressions or negative expressions. In addition to the positive and negative expressions, the noun may include expressions having the meaning of "need to consider" and "need to answer", which correspond to the "action item" or "issue" statement type. The auxiliary verb, which is usually placed at the end of sentence, may have expressions having the meaning of "expectation", "duty", "necessity", "request", "proposal", "affirmativeness", "assumption", "informative", and "evaluation". With the classifier capable of determining a statement type based on features, the meeting assistance system 1 is able to determine a statement type with high accuracy.

The natural language processing based on machine learning is performed using any desired known method.

FIG. 23 is a conceptual diagram illustrating a natural language processing based on machine learning, performed by the meeting assistance system 1 of this example. The meeting assistance system 1 trains the classifier CLF with supervised learning. The classifier CLF is input with data ("DATA") of a collection of pairs of feature and value. The classifier CLF is input with text data TSD, which corresponds to the statement being input. The classifier CLF outputs a class to which the text data TSD belongs. In this example, the class, which is indicated by a class label CLB, corresponds to a statement type of the statement being input (that is, the text data TSD).

In order to train the classifier CLF with a machine learning algorithm, the meeting assistance system 1 inputs, as train data TRD, a collection of the data ("DATA") and a class ("CLASS LABEL") that the data belongs. As the train data TRD is input, the meeting assistance system 1 trains the classifier CLF with the machine learning algorithm. After training, the meeting assistance system 1 is able to use the classifier CLF to analyze the test data TSD being input, and output the class to which the text data TSD belongs.

Compared to pattern matching, the classifier CLF is able to determine a statement type with higher accuracy. Further, unlike pattern matching that requires updating of a rule, maintenance of data would be easier for the classifier CLF.

Further, in this embodiment, the class label may be changed according to the user preferences. For example, if the class label CLB determined by the classifier CLF differs from a class intended by any meeting participant, such class label CLB may be changed. More specifically, even when the statement is determined to be the "opinion" statement with the classifier CLF, the meeting assistance system 1 may change a statement type to the "question" through changing the class label being output.

With this feedback, the meeting assistance system 1 is able to further train the classifier CLF with the modified data in a substantially similar manner as described above for the case of inputting the train data TRD. That is, even without updating the train data TRD, the meeting assistance system 1 is able to train the classifier CLF to improve accuracy in determining a statement type.

In another example, the classifier CLF may be trained with information regarding a speaker of a specific statement, as feature. The meeting assistance system 1 is able to determine a statement type, while taking into account the general trend of the speaker who made a specific statement. This further improves the accuracy in determining a statement type.

The meeting assistance system 1 may determine a statement type, based on a role of the meeting participant in that meeting, who made a specific statement. For example, if the purpose of meeting is to report, and the speaker of the statement is a decision maker who makes a decision based on the report, the meeting assistance system 1 is able to use feature of the speaker to determine a statement type. The meeting assistance system 1 is able to determine a statement type, while taking into account the general trend of the speaker who made a specific statement. This further improves the accuracy in determining a statement type. Especially, depending on the purpose of meeting, the meeting assistance system 1 is able to determine statement types "action item" and "decision" with higher accuracy.

On the other hand, if the statement types, that is, the class labels increase in number, accuracy in classification may decrease. In view of this, the meeting assistance system 1 may group the statement types into a plurality of groups. In the following, it is assumed that the statement types include "proposal (R)", "question (Q)", "answer (A)", "positive opinion (O(P))", "negative opinion (O(N))", "neutral opinion (O(E))", "comment (C)", "request (RE)", "issue (I)", "action item (A.I.)", and "decision (D)".

In this example, the statement types are grouped into a first group and a second group.

The first group includes "proposal (R)", "question (Q)", "answer (A)", "positive opinion (O(P))", "negative opinion (O(N))", "neutral opinion (O(E))", "comment (C)", and "request (RE)". The second group includes "issue (I)", "action item (A.I.)", and "decision (D)". For each of the first group and the second group, the meeting assistance system 1 determines, from among the statement types in the group, a type of statement corresponding to the input statement. In the example case illustrated in FIG. 23, the classifier CLF is prepared for each group of statement types.

For example, it is assumed that the statement "Please discuss with other to solve this issue" is input during the meeting. This statement is determined to be the "answer" type of the first group, as well as the "action item" type of the second group.

For example, it is assumed that the "action item" and "decision" statement types, both belonging to the second group, are determined to be important in such meeting. In such case, the meeting assistance system 1 refers to the second group to extract the statements that are determined to be more important. This improves accuracy in extracting the statements with important statement types. Compared to the case where the statement types are not broken down into groups, the meeting assistance system 1 is able to determine a statement type with improved accuracy.

Figure 24:
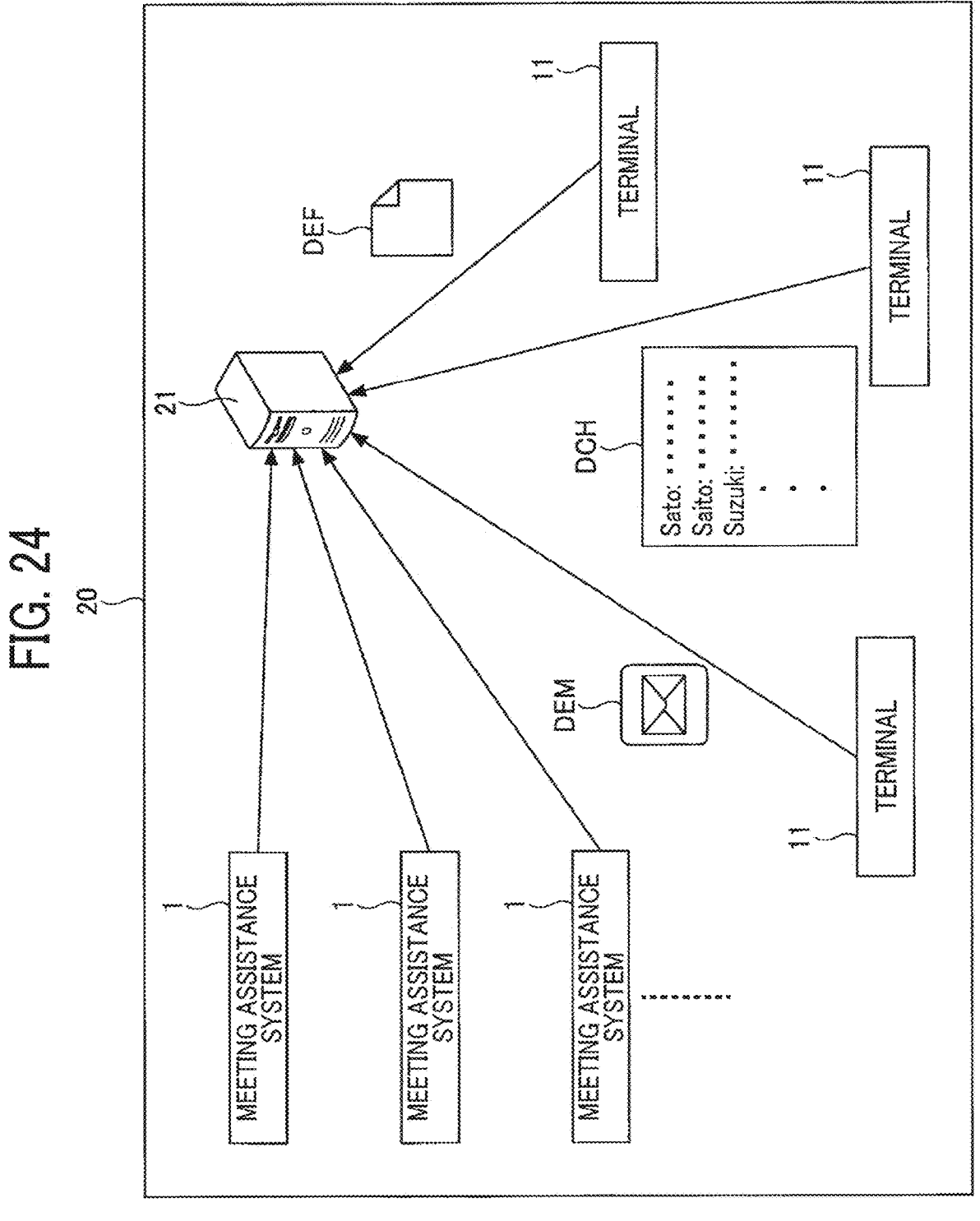
FIG. 24 is a schematic block diagram illustrating a configuration of an information sharing assistance system, according to an embodiment.

FIG. 24 is a schematic diagram illustrating an overall configuration of an information sharing assistance system 20 according to another embodiment. For example, the information sharing assistance system 20 includes a plurality of meeting assistance systems 1 and an information sharing server 21. As illustrated in FIG. 24, the information sharing assistance system 20 may include more than one meeting assistance system 1, each of which corresponds to the meeting assistance system 1 of any one of the above-described embodiments. Alternatively, the meeting assistance system 1, the information sharing server 21, and the terminal 11 may not be implemented by separate devices. For example, the meeting assistance system 1 and the information sharing server 21 may be implemented by one information processing apparatus such as the server. The overview of the information sharing assistance system 20 is described below.

The information sharing server 21 is input with various data representing a communication log from an external device. For example, the information sharing server 21 receives email data DEM, chat data DCH, and electronic file data DEF, from the terminals 11.

That is, the information sharing assistance system 20 is input with sentences in various data formats, which are not limited to statements made during the meeting as described above. Further, the time of input may not only be limited to the time during the meeting, but any time during a predetermined time period. Any data, such as the email data DEM, the chat data DCH, and the electronic file data DEF, may be input to the information sharing server 21 from any device.

For example, it is often that the meeting participants, or users involving the project, communicate with one another not only during the meeting, but also outside the meeting, through various communication means such as email or chat. The information sharing assistance system 20 keeps a record of, or organize, all communications related to the project, for example, to allow the user (such as the project leader, manager, etc.) to check the progress or review the issues.

For example, any user may send email data to other user, while also entering an address of the information sharing server 21 to "TO" field. The information sharing server 21 is able to keep a record of emails transmitted or received between the users. The information sharing server 21 may also manage a log of chat data exchanged between the users. Further, the information sharing server 21 is able to manage electronic data files, which is transmitted from one user to other user, for example, with email data. The electronic data file may also be obtained from the meeting memos. The information sharing server 21 may thus include an email server or a document server, or may at least include an interface with such email server or document server.

Assuming that the information sharing server 21 stores sufficient data for analysis, if a user such as a manager accesses the information sharing server 21, a screen that is substantially similar to the screen of FIG. 14 is displayed, for example. In response to selection of the key 1303, the information sharing assistance system 20 outputs the sentences, which are input in various data formats, as follows.

Figure 25:
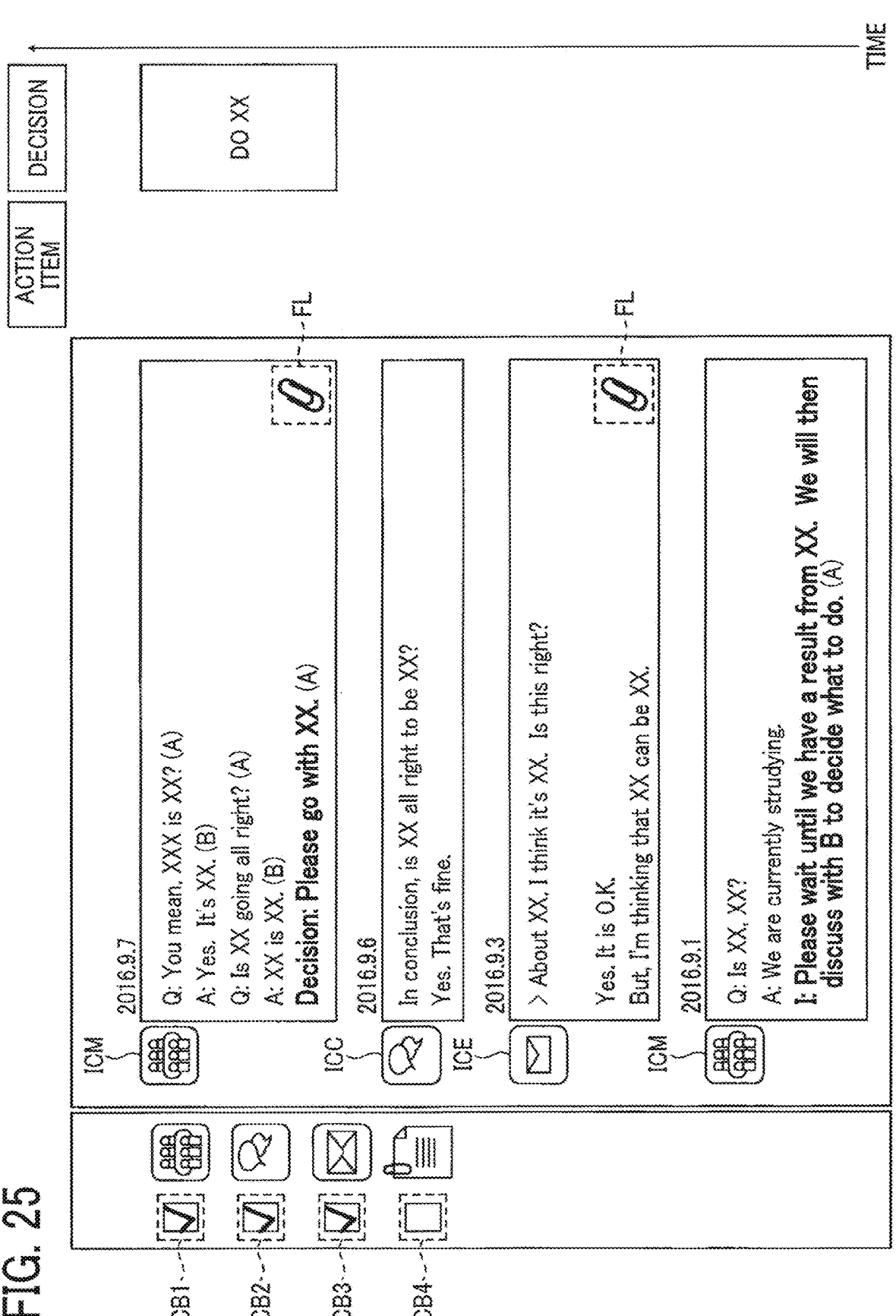
FIG. 25 is an illustration of an example screen, displayed by the information sharing assistance system of FIG. 24.

FIG. 25 is an illustration of an example screen displaying sentences, displayed by the information sharing assistance system 20, according to the embodiment. The information sharing server 21 displays the screen of FIG. 25 on any display, such as an external display or a display for each terminal 11, to share information with the user.

While the screen of FIG. 25 is displayed in response to selection of the "view" key 1303 in FIG. 14, the screen of FIG. 25 may be displayed in various other ways. For example, when the statement having the "issue" statement type is input to the communication log, a specific user such as the manager is notified of addition of the "issue" statement, for example, by push notification by email. In this example, the specific statement type is previously set. Further, one or more statement types may be set as the specific statement type. When the user accesses a link in the push notification (such as a URL in the email), the screen of FIG. 25 may be displayed to the user.

For example, the information sharing server 21 may generate the screen illustrated in FIG. 25 as described below.

Figure 26:
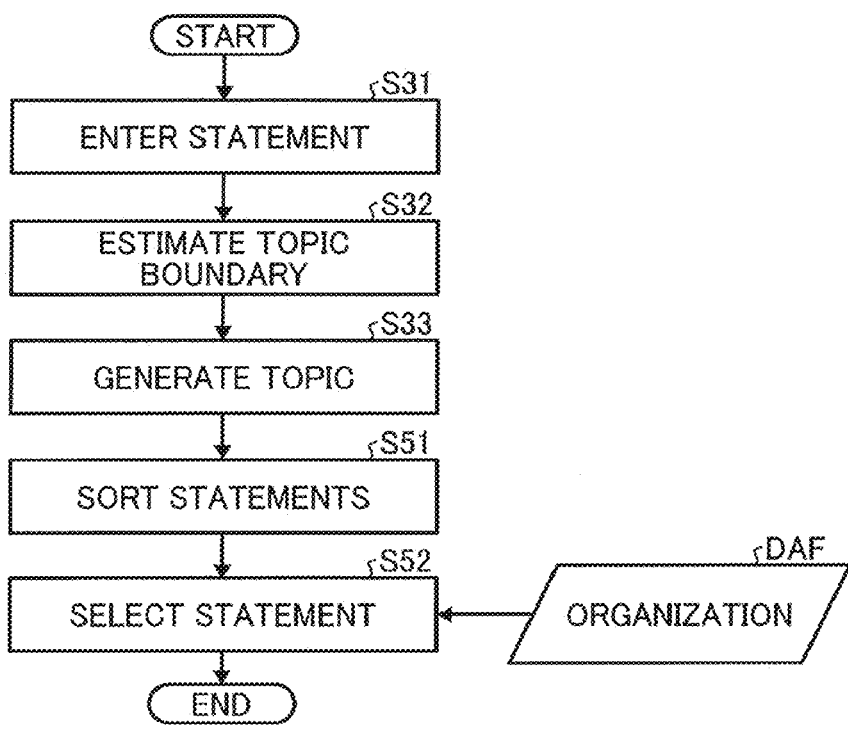
FIG. 26 is a flowchart illustrating operation of generating sentences for output, performed by the information sharing assistance system of FIG. 24, according to an embodiment.

FIG. 26 is a flowchart illustrating operation of generating a topic, performed by the information sharing assistance system 20, according to the embodiment. The operation of FIG. 26 is performed by the CPU 10H1 of the information sharing server 21. S31 to S33 are performed in a substantially similar manner as described above referring to S31 to S33 of FIG. 12.

However, in this example, the statement to be input is not only limited to the statement made during the meeting. In such case, the information sharing server 21 may store the statements that have been input in different databases by sources from which such statements are extracted. For example, the information sharing server 21 stores the statements extracted from the meeting memos, or input during the meeting, in a meeting database. The information sharing server 21 stores the sentences extracted from the emails in an email database. The information sharing server 21 stores the sentences extracted from the chat data in a chat database. The information sharing server 21 stores the electronic data file in a document database.

At S51, the information sharing assistance system 20 sorts the sentences. For example, as described above, the information sharing assistance system 20 is able to extract one or more sentences having specific statement types. At S51, the information sharing assistance system 20 sorts the extracted sentences in, for example, chronological order according to a time of input.

The screen of FIG. 25 illustrates the sentences, which are arranged in chronological order, such that the sentences with older dates are displayed at bottom and the sentences with newer dates are displayed at top. With display of sentences sorted in chronological order, the user is able to instantly know a flow of discussions to achieve the goal or agenda.

The sentences of specific statement types to be output may be further selected according to the user preferences. For example, the information sharing assistance system 20 may select one or more sentences for output as follows.

At S52, the information sharing assistance system 20 selects one or more sentences for output. For example, the information sharing assistance system 20 selects the sentences, according to the data format of the sentence being input. More specifically, in the example case illustrated in FIG. 24, the meeting assistance system 1 inputs the sentences to the information sharing server 21 in a data format of meeting memos or notes. The terminal 11 inputs sentences to the information sharing server 21, as email data DEM, chat data DCH, or electronic file data DEF. That is, the information sharing assistance system 20 has sentences, which are input in any of four data formats.

In the screen of FIG. 25, a meeting icon ICM indicates that the sentences are extracted from the meeting memos or notes. A chat icon ICC indicates that the sentences are extracted from the chat data DCH. An email icon ICE indicates that the sentences are extracted from the email data DEM. Through displaying the icons each indicating a source of sentences, the user is able to know, for example, a background that a specific statement (sentence) has been made.

Further, as illustrated in FIG. 25, each group of statements may be associated with attachment data FL. The attachment data FL may be, for example, presentation material that has been presented at the meeting, or attachment file attached to the email. With the attachment data FL associated with the output sentences, the user can easily access the attachment data FL to understand more about how each sentence has been made. In another example, even in the case of sharing meeting memos among the meeting participants, the user is able to quickly access the presentation material. This is especially convenient if the user works remotely from the office, such as in the case of a teleworker.

If the user wants to see only the sentences extracted from a specific source, the user can select one or more of the check boxes CB1, CB2, CB3, and CB4, to select a source of the sentences to be displayed. More specifically, in response to selection of the check box CB1, the information sharing assistance system 20 outputs the sentences extracted from the meeting memos. In response to selection of the check box CB2, the information sharing assistance system 20 outputs the sentences extracted from the chat data DCH. In response to selection of the check box CB3, the information sharing assistance system 20 outputs the sentences extracted from the email data DEM. In response to selection of the check box CB4, the information sharing assistance system 20 outputs the sentences extracted from the electronic file data DEF.

In the screen of FIG. 25, the check boxes CB1, CB2, and CB3 are selected. Accordingly, the information sharing assistance system 20 selects, from among the input sentences, the sentences extracted from the meeting memos, chat data DCH, and email data DEM for output.

The information sharing assistance system 20 does not have to select sentences based on a data format of source data. For example, in case the sentences are extracted from the email data DEM, the email data DEM includes information regarding a sender of email such as organization data DAF indicating an organization that the sender belongs. For example, the organization data DAF may be an email address indicating a transmission source of email.

The information sharing assistance system 20 may be previously set with a specific organization name. The information sharing assistance system 20 refers to the organization data DAF to select email data DEM that is transmitted from any user who belongs to the specific organization name that is previously set. In this way, the information sharing assistance system 20 is able to output sentences that are made by users who belong to the specific organization. For example, the user is able to only select the sentences made by users who belong to the same organization, for output onto the screen of FIG. 25.

While the organization name may be specified according to the user preference, the information sharing assistance system 20 may only allow the user to view information relating to the organization that the viewing user belongs. Further, in alternative to the organization name, a specific project name (or a project code) may be selected as long as such project name (or a project code) has been assigned to data (statement) that has been input.

In any one of the above-described embodiments, the statements made during the meeting have been input for analysis or sharing. However, the statements made during the meeting do not have to be input as illustrated in FIG. 27.

Figure 27:
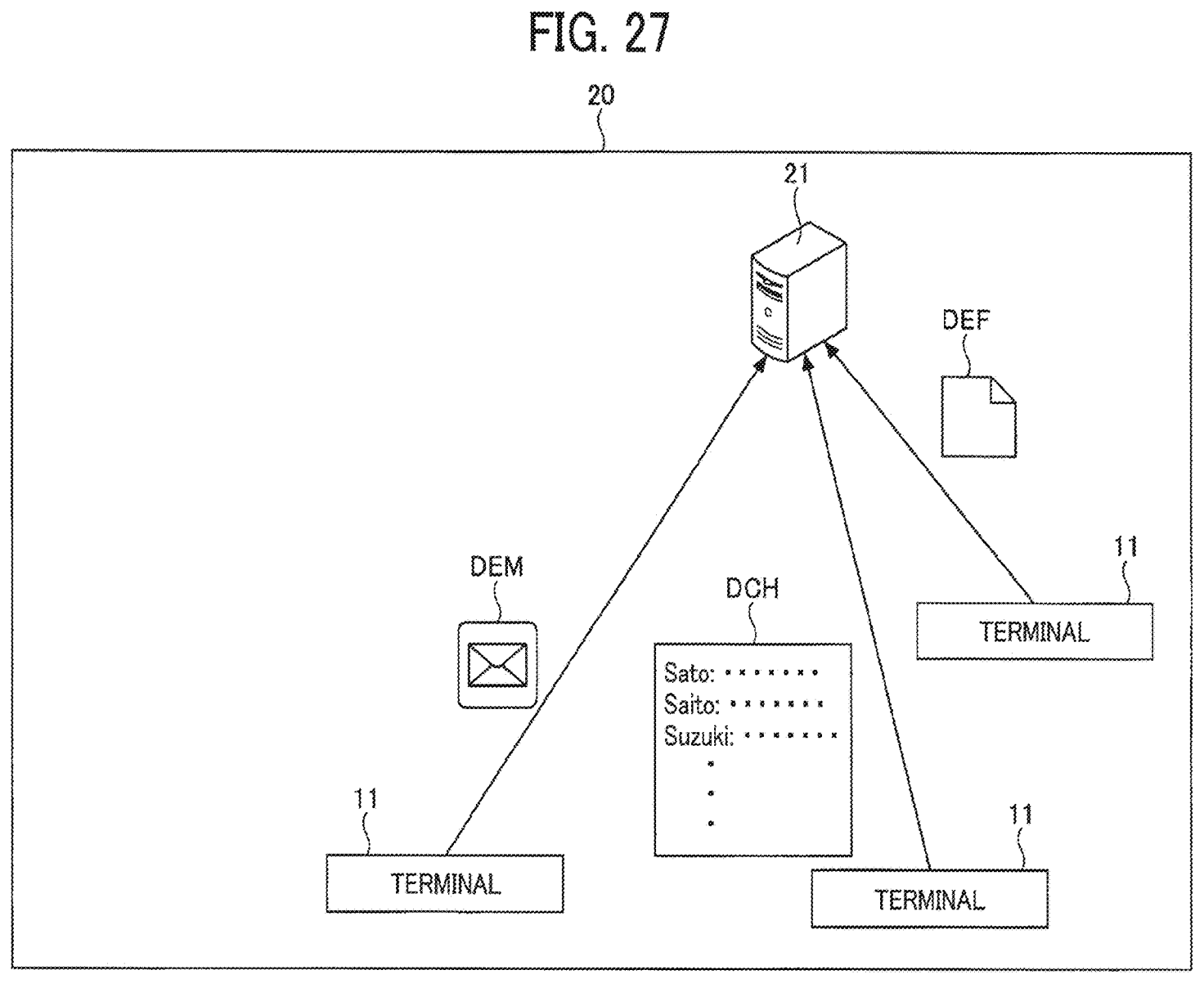

FIG. 27 is a schematic diagram illustrating an overall configuration of the information sharing assistance system 20 according to an embodiment. Compared to the information sharing assistance system 20 of FIG. 24, the information sharing assistance system 20 of FIG. 27 does not have the meeting assistance system 1.

In this example, the information sharing assistance system 20 is input with email data DEM, chat data DCH, and electronic file data DEF, or any combination thereof. That is, the information sharing assistance system 20 may be input with any desired type of data representing a log of communications among users.

That is, the statements to be input to the information sharing assistance system 20 could be generated by any means, such as by speaking, writing, typing, or displaying, at any time. In a substantially similar manner, even during the meeting, the statement may be generated by any means, such as by speaking, writing, typing, or displaying.

The above-described operations may be performed, partly or entirely, by a CPU according to a software program written in any desired programming language such as assembler, C, C++, C #, Java (Registered Trademark), Javascript (Registered Trademark). Python (Registered Trademark). Ruby, and PHP, or object-oriented programming language. The software program causes one or more information processing apparatuses to perform a set of instructions.

The software program may be, partly or entirely, distributed in the form of a computer-readable recording medium such as a ROM, Electrically Erasable Programmable ROM (EEPROM), EPROM, flash memory, flexible disk, CD-ROM, CD-RW, DVD-ROM, DVD-RAM, DVD-RW, blue disc, SD (Registered Trademark) card, or MO. The software program may be downloaded onto any apparatus via a network.

The information sharing assistance system 20 of any one of the above-described embodiments may include two or more information processing apparatuses connected through a network. In such case, the various types of processing may be, partly, or entirely, distributed over a plurality of servers on the network. In another example, the processing may be performed concurrently by a duplex system. Alternatively, the processing may be performed by a dual system, which may overlap in part.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A system, comprising:
   circuitry configured to
   input a plurality of speech statements during a meeting;
   determine each speech statement of the plurality of speech statements which is a candidate of an action item; and
   display a screen including:
      a graphical user interface,
      each speech statement determined to be a candidate of an action item, and
      for each respective speech statement determined to be a candidate of an action item, (A) a first user interface element configured to receive a first user input to set a corresponding due date for the action item, (B) the corresponding due date for the action item, and (C) a second user interface element configured to receive a second user input to edit a person in charge of the action item, wherein the graphical user interface displays each speech statement in association with a corresponding action item, the corresponding due date set by the first user input and a corresponding person in charge set by the second user input.

2. The system of claim 1, wherein the circuitry is further configured to estimate a topic boundary that classifies the plurality of speech statements into one or more groups, and generate a topic for each group of the one or more groups classified by the topic boundary.

3. The system of claim 2, wherein the topic is one or more words which expresses at least one of a subject, theme, feature, or issue, common to a plurality of sentences belonging to a same group.

4. The system of claim 1, wherein the screen includes, for each respective speech statement determined to be a candidate of an action item, information indicating that the respective speech statement is determined as the candidate of the action item.

5. The system of claim 1, wherein the circuitry is further configured to identify a speaker of each speech statement from a plurality of participants of the meeting; and for each respective speech statement determined to be a candidate of an action item, display the respective speech statement in association with the speaker.

6. The system of claim 1, wherein the circuitry is further configured to evaluate the meeting based on the plurality of speech statements; and output a result of the evaluation.

7. The system of claim 6, wherein the circuitry is configured to evaluate the meeting based on a length of time of the meeting and a scheduled length of time of the meeting.

8. The system of claim 1, wherein the circuitry is further configured to calculate a cost of the meeting based on labor costs of one or more participants of the meeting; and output the calculated cost.

9. The system of claim 1, wherein the circuitry is further configured to output a communication diagram indicating communications among a plurality of users during the meeting or email the communication diagram including a plurality of lines each representing the communications between the plurality users; and in response to a selection of a specific line, display a log of the communications represented by the specific line.

10. The system of claim 1, wherein the circuitry is further configured to select a speech statement to be output, based on at least one of an organization to which a speaker of the speech statement or a data format of the speech statement.

11. The system of claim 1, wherein the circuitry is further configured to determine, for each speech statement of the plurality of speech statements, a type of the speech statement; and determine that one or more input speech statements having a specific type are the candidate of the action item.

12. A method, comprising:

inputting a plurality of speech statements during a meeting;

determining each speech statement of the plurality of speech statements which is a candidate of an action item; and displaying a screen including:

a graphical user interface, each speech statement determined to be a candidate of an action item, and for each respective speech statement determined to be a candidate of an action item, (A) a first user interface element configured to receive a first user input to set a corresponding due date for the action item, (B) the corresponding due date for the action item, and (C) a second user interface element configured to receive a second user input to edit a person in charge of the action item, wherein the graphical user interface displays each speech statement in association with a corresponding action item, the corresponding due date set by the first user input and a corresponding person in charge set by the second user input.

13. A non-transitory recording medium storing a plurality of instructions which, when executed by one or more processors, causes the one or more processors to perform a method comprising:

inputting a plurality of speech statements during a meeting;

determining each speech statement of the plurality of speech statements which is a candidate of an action item; and displaying a screen including:

a graphical user interface, each speech statement determined to be a candidate of an action item, and for each respective speech statement determined to be a candidate of an action item, (A) a first user interface element configured to receive a first user input to set a corresponding due date for the action item, (B) the corresponding due date for the action item, and (C) a second user interface element configured to receive a second user input to edit a person in charge of the action item, wherein the graphical user interface displays each speech statement in association with a corresponding action item, the corresponding due date set by the first user input and a corresponding person in charge set by the second user input.

14. An apparatus, comprising:

circuitry configured to:

input a plurality of speech statements during a meeting;

determine each speech statement of the plurality of speech statements which is a candidate of an action item; and display a screen including:

a graphical user interface, each speech statement determined to be the candidate of the action item, and for each respective speech statement determined to be the candidate of the action item, (A) a first user interface element configured to receive a first user input to set a corresponding due date for the action item, (B) the corresponding due date for the action item, and (C) a second user interface element configured to receive a second user input to edit a person in charge of the action item, wherein the graphical user interface displays each speech statement in association with a corresponding action item, the corresponding due date set by the first user input and a corresponding person in charge set by the second user input.

15. The system of claim 1, wherein each action item represents a task to be performed arising from discussion during the meeting.

16. The system of claim 1, wherein the circuitry is further configured to determine a type for each of the plurality of speech statements.

17. The system of claim 1, wherein the first user interface element is a calendar in which the corresponding due date is selected via the first user input.

18. The system of claim 1, wherein the second user interface element includes a list of persons in charge for selection via the second user input.

\* \* \* \* \*